(12) United States Patent
Gupta et al.

(10) Patent No.: US 11,281,594 B2
(45) Date of Patent: Mar. 22, 2022

(54) MAINTAINING GHOST CACHE STATISTICS FOR DEMOTED DATA ELEMENTS

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/798,330

(22) Filed: Feb. 22, 2020

(65) Prior Publication Data

US 2021/0263862 A1   Aug. 26, 2021

(51) Int. Cl.
*G06F 12/128* (2016.01)
*G06F 12/123* (2016.01)
*G06F 12/0804* (2016.01)

(52) U.S. Cl.
CPC ........ *G06F 12/128* (2013.01); *G06F 12/0804* (2013.01); *G06F 12/124* (2013.01); *G06F 2212/604* (2013.01)

(58) Field of Classification Search
CPC .. G06F 12/0804; G06F 12/124; G06F 12/128; G06F 2212/604
See application file for complete search history.

(56) References Cited

U.S. PATENT DOCUMENTS

| 8,924,646 | B2 | 12/2014 | McKean et al. |
| 9,760,493 | B1 | 9/2017 | Wang |
| 9,772,949 | B2 | 9/2017 | Maybee et al. |
| 9,842,060 | B1 | 12/2017 | Jannyavula Venkata |
| 10,061,775 | B1 | 8/2018 | Tripathi et al. |
| 10,127,156 | B1 * | 11/2018 | Yan ..................... G06F 12/0873 |
| 10,296,466 | B2 | 5/2019 | Kato |
| 10,558,583 | B1 | 2/2020 | Narasimhan |
| 10,691,613 | B1 * | 6/2020 | Tong ................... G06F 12/0811 |

(Continued)

FOREIGN PATENT DOCUMENTS

EP   1452978 A2   9/2004

OTHER PUBLICATIONS

List of IBM Patents and Patent Applications Treated as Related.

*Primary Examiner* — Aracelis Ruiz
(74) *Attorney, Agent, or Firm* — Nelson IP; Daniel P. Nelson

(57) ABSTRACT

A method for maintaining statistics for data elements in a cache is disclosed. The method maintains a heterogeneous cache comprising a higher performance portion and a lower performance portion. The method maintains, within the lower performance portion, a ghost cache containing statistics for data elements that are currently contained in the heterogeneous cache, and data elements that have been demoted from the heterogeneous cache within a specified time interval. The method maintains updates to the statistics in an update area within the higher performance portion. The method determines whether the updates have reached a specified threshold and, in the event the updates have reached the specified threshold, flushes the updates from the update area to the ghost cache to update the statistics. A corresponding system and computer program product are also disclosed.

25 Claims, 21 Drawing Sheets

(56) References Cited

U.S. PATENT DOCUMENTS

| | | |
|---|---|---|
| 2009/0254710 A1 | 10/2009 | Nonogaki |
| 2012/0054445 A1* | 3/2012 | Swart .................... G06F 12/121 |
| | | 711/133 |
| 2012/0089782 A1* | 4/2012 | McKean ............. G06F 12/0804 |
| | | 711/122 |
| 2013/0242425 A1 | 9/2013 | Zayas |
| 2014/0115260 A1 | 4/2014 | Maybee et al. |
| 2017/0124001 A1* | 5/2017 | Ash ....................... G06F 12/123 |
| 2017/0177239 A1 | 6/2017 | Ono |
| 2018/0373645 A1* | 12/2018 | Anderson ........... G06F 12/0831 |
| 2019/0243783 A1 | 8/2019 | Lewis |

* cited by examiner

MAINTAINING GHOST CACHE STATISTICS FOR DEMOTED DATA ELEMENTS

BACKGROUND

Field of the Invention

This invention relates to systems and methods for implementing a cache made up of heterogeneous memory types.

Background of the Invention

In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

Caches are often provided as multi-level caches. For example, a caching system may include both a "primary" and "secondary" caches. When reading data, a computing system or device may first look for data in the primary cache and, if the data is absent, look for the data in the secondary cache. If the data is not in either cache, the computing system or device may retrieve the data from disk drives or other backend storage devices that reside behind the cache. When writing data, a computing system or device may write data to the primary cache. This data may eventually be destaged to the secondary cache or a storage device to make room in the primary cache.

Flash memory and other solid-state memory devices can potentially create caches with much larger storage capacities than those using more expensive memory such as dynamic random-access memory (DRAM) cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM uses flash memory to store data, SCM exhibits some of the same limitations and deficiencies as flash memory, such as write-cycle limits and issues with data fragmentation.

In view of the foregoing, what are needed are systems and methods to effectively incorporate flash memory, such as SCM, into a cache. Ideally, such systems and methods will take into account limitations and deficiencies of flash memory, such as write-cycle limits and data fragmentation issues.

SUMMARY

The invention has been developed in response to the present state of the art and, in particular, in response to the problems and needs in the art that have not yet been fully solved by currently available systems and methods. Accordingly, systems and methods have been developed to implement a cache made up of heterogeneous memory types. The features and advantages of the invention will become more fully apparent from the following description and appended claims, or may be learned by practice of the invention as set forth hereinafter.

Consistent with the foregoing, a method for maintaining statistics for data elements in a cache is disclosed. The method maintains a heterogeneous cache comprising a higher performance portion and a lower performance portion. The method maintains, within the lower performance portion, a ghost cache containing statistics for data elements that are currently contained in the heterogeneous cache, and data elements that have been demoted from the heterogeneous cache within a specified time interval. The method maintains updates to the statistics in an update area within the higher performance portion. The method determines whether the updates have reached a specified threshold and, in the event the updates have reached the specified threshold, flushes the updates from the update area to the ghost cache to update the statistics.

The recited ghost cache advantageously enables statistics to be maintained for data elements that are currently contained in a heterogeneous cache, as well as data elements that have been demoted from the heterogeneous cache within a specified time interval. The statistics enable more relevant data to be retained in the heterogeneous cache. Furthermore, by keeping updates to the ghost cache in an "update area" within the higher performance portion, writes to the lower performance portion may be limited. This allows the lower performance memory to be implemented in flash memory such as SCM.

In certain embodiments, the statistics include reads counts and/or write counts. This enables the method to prioritize the retention of data that is read often but not written to often.

In certain embodiments, the method periodically decrements the read count and write count of each data element. This enables certain data elements to be demoted from the heterogeneous cache when their counts reach zero or fall below a threshold.

In certain embodiments, the method removes, from the ghost cache, statistics for data elements whose read count and write count are zero. This feature enables less frequently accessed data elements to be demoted from the cache.

In certain embodiments, the method removes, from the ghost cache, statistics for data elements whose read count and write count are below a threshold. This feature enables less frequently accessed data elements to be demoted from the cache.

In certain embodiments, determining whether the updates have reached the specified threshold comprises determining whether the update area is full. This allows updates to be flushed from the update area when the update area is full, thereby creating space in the update area for additional updates.

In another aspect of the invention, a method maintains a heterogeneous cache comprising a higher performance portion and a lower performance portion. The method maintains, within the lower performance portion, a ghost cache containing statistics for data elements that are currently contained in the heterogeneous cache, and data elements that have been demoted from the heterogeneous cache within a specified time interval. The method maintains, as part of the statistics, a read and write count for each of the data elements. The method maintains updates to the statistics in an update area within the higher performance portion. The method determines whether the updates have reached a specified threshold and, in the event the updates have reached the specified threshold, flushes the updates from the update area to the ghost cache to update the statistics.

The recited ghost cache advantageously enables statistics to be maintained for data elements that are currently contained in a heterogeneous cache, as well as data elements that have been demoted from the heterogeneous cache within a specified time interval. The statistics, and more particularly the read count and write count for each data element, enable more relevant data to be retained in the heterogeneous cache. By keeping updates to the ghost cache in an "update area" within the higher performance portion, writes to the lower performance portion may be limited. This allows the lower performance memory to be implemented in flash memory such as SCM.

In certain embodiments, the method periodically decrements the read count and write count of each data element. This enables certain data elements to be demoted from the heterogeneous cache when their counts reach zero or fall below a threshold.

In certain embodiments, the method removes, from the ghost cache, statistics for data elements whose read count and write count are below a threshold. This feature enables less frequently accessed data elements to be demoted from the cache.

In certain embodiments, determining whether the updates have reached the specified threshold comprises determining whether the update area is full. This allows updates to be flushed from the update area when the update area is full.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
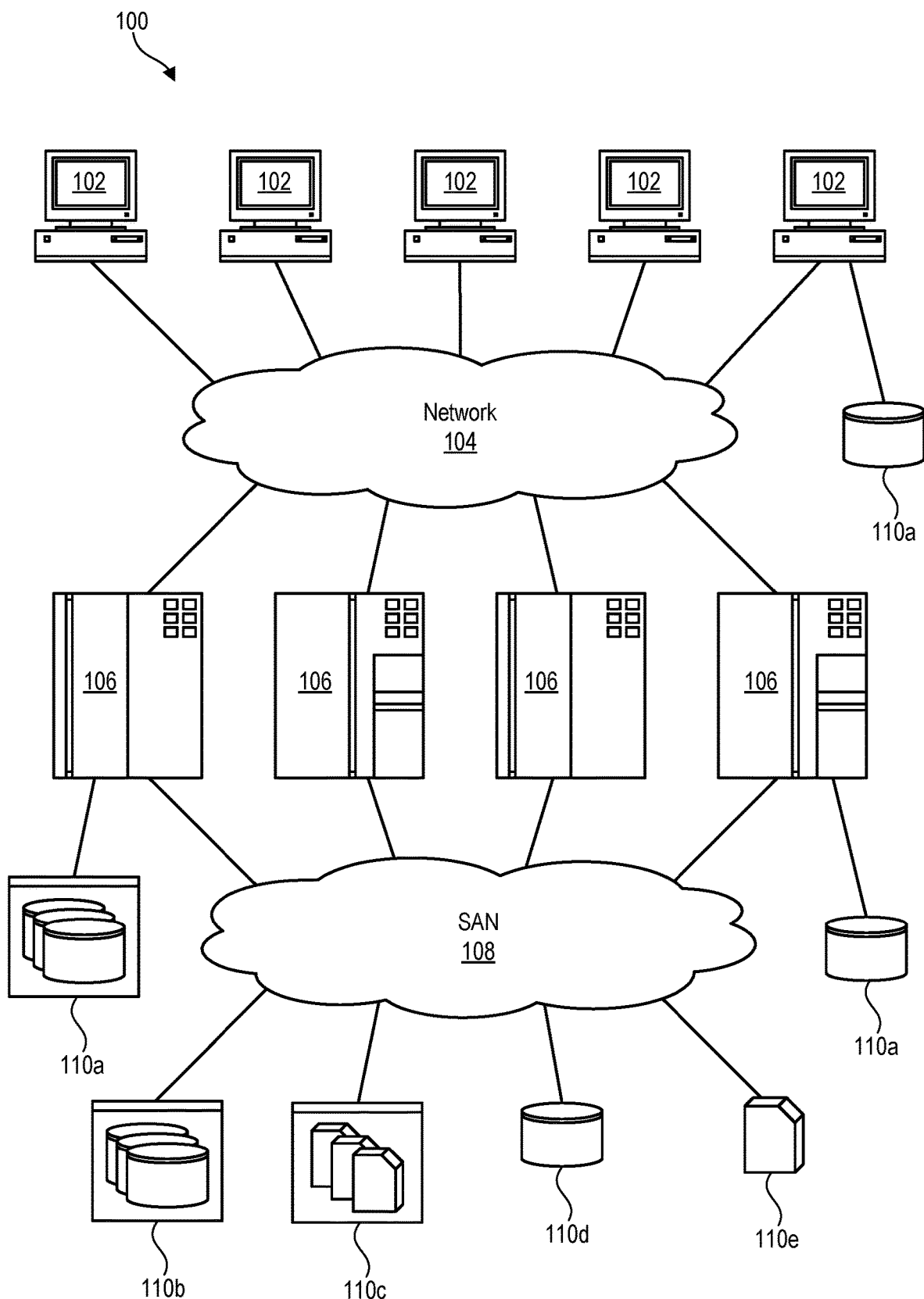
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
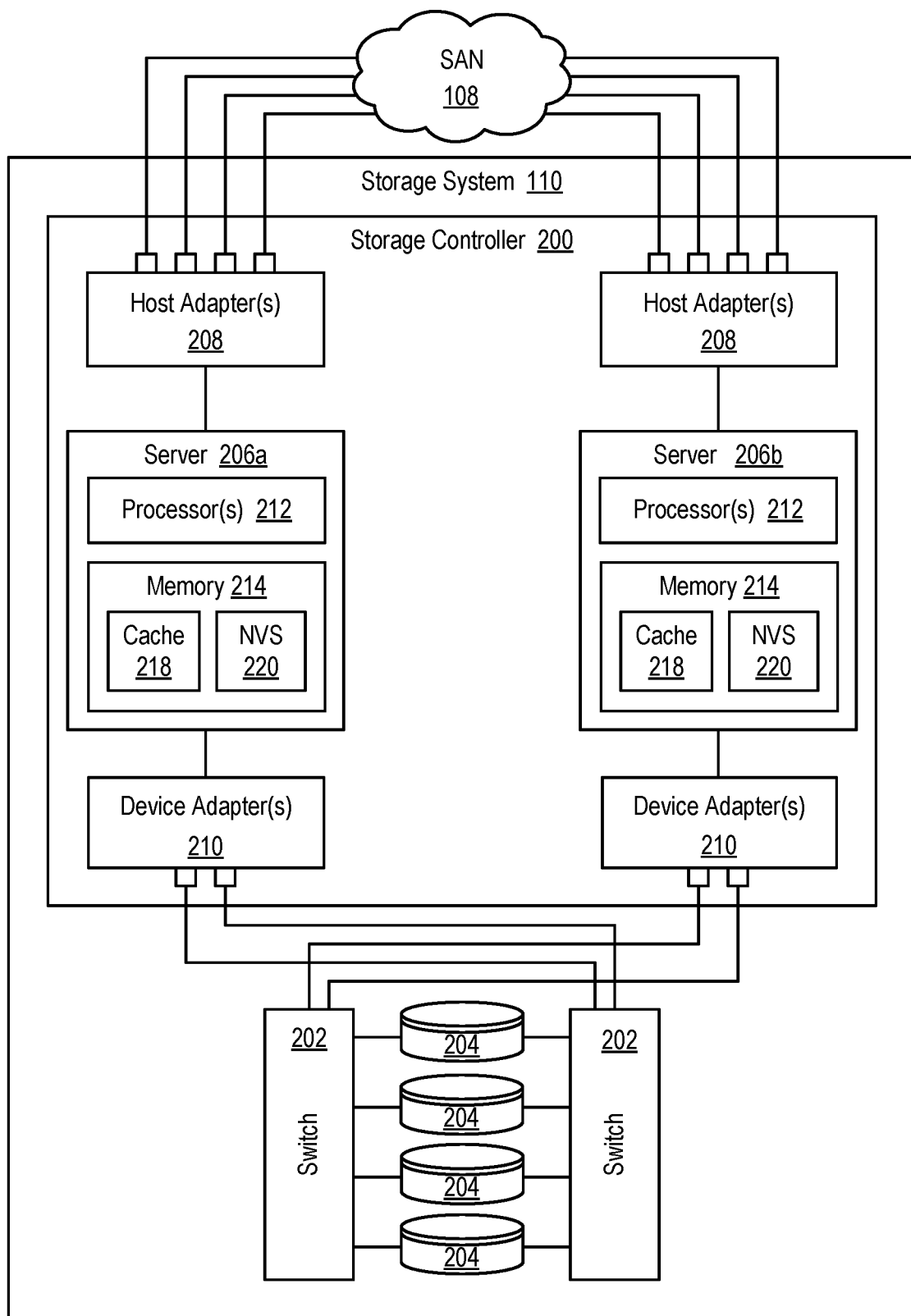
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it in its cache 218 in the event it is required again. If the data is requested again by a host system 106, the server 206 may fetch the data from the cache 218 instead of fetching it from the storage drives 204, saving both time and resources. Similarly, when a host system 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000® enterprise storage system. The DS8000® is a high-performance, high-capacity storage controller providing disk storage that is designed to support continuous operations. Nevertheless, the systems and methods disclosed herein are not limited to operation with the IBM DS8000® enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000® is presented by way of example and is not intended to be limiting.

Figure 3:
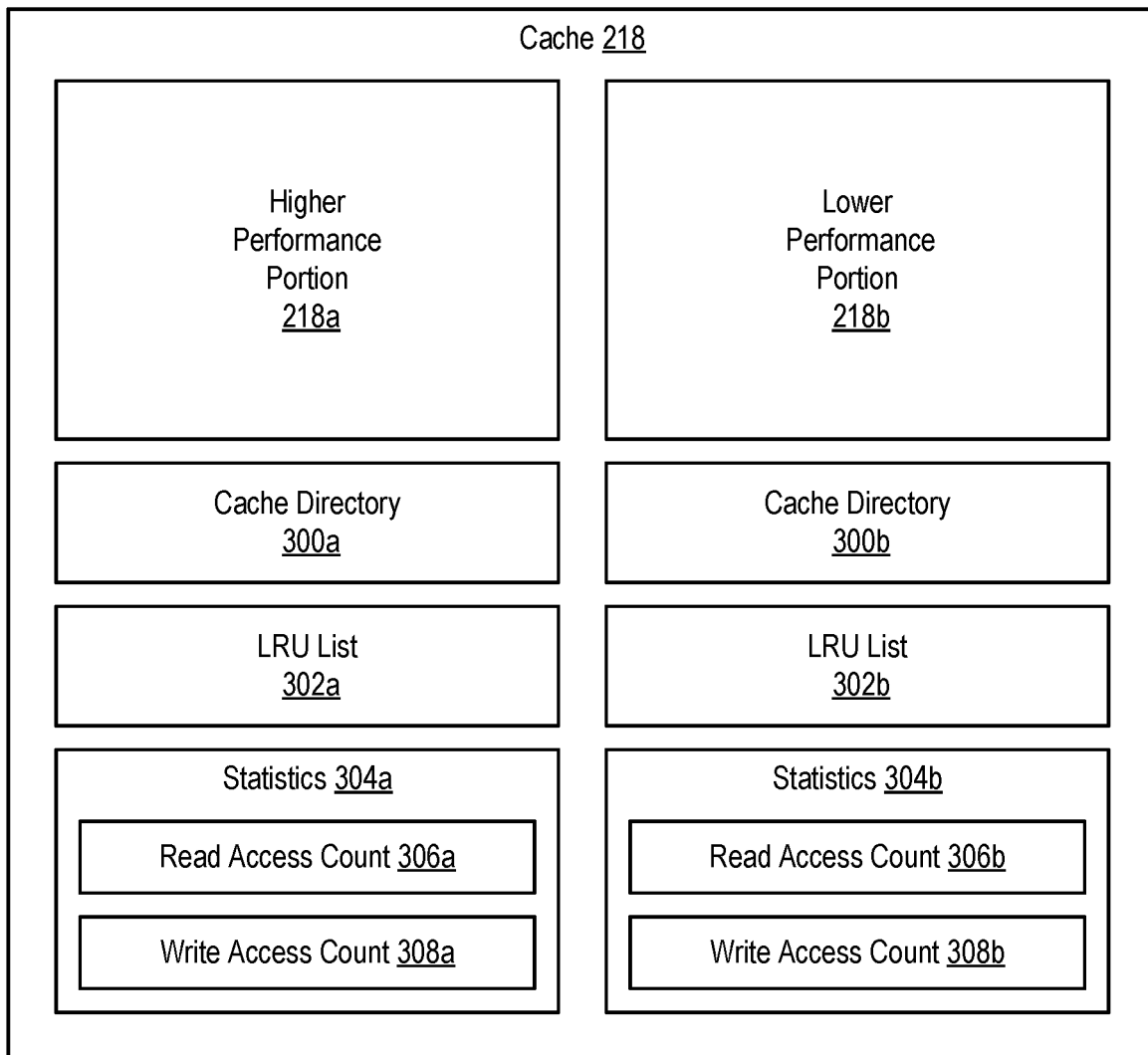
FIG. 3 is a high-level block diagram showing a cache comprising a higher performance portion (e.g., DRAM cache) and a lower performance portion (e.g., SCM cache)

Referring to FIG. 3, as previously mentioned, flash memory and other solid-state memory devices can potentially create caches with much larger storage capacities than those using more expensive memory such as DRAM cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of its potential to create caches with much larger storage capacities, systems and methods are needed to effectively incorporate flash memory, such as SCM, into cache. Ideally, such systems and method will take into account the limitations and deficiencies of flash memory, such as write-cycle limits and data fragmentation issues.

FIG. 3 is a high-level block diagram showing a heterogeneous cache 218 (i.e., a cache 218 made up of heterogeneous memory types) comprising a higher performance portion 218a and a lower performance portion 218b. In certain embodiments, the higher performance portion 218a is made up of DRAM memory and the lower performance portion 218b is made up of SCM memory, although neither are limited to these types of memory. The higher performance portion 218a and lower performance portion 218b may be used together to provide a cache 218 within a storage system 110 such as the IBM DS8000® enterprise storage system. Because memory making up the lower performance portion 218b is likely cheaper than memory making up the higher performance portion 218a, the lower performance portion 218b may be larger, perhaps much larger, than the higher performance portion 218a.

As shown, the higher performance portion 218a may have associated therewith a cache directory 300a, an LRU (least recently used) list 302a, and statistics 304a. The cache directory 300a may record which data elements are stored in the higher performance portion 218a and where they are stored. The LRU list 302a may be used to determine which data element in the higher performance portion 218a is the least recently used. The statistics 304 may include a read access count 306a and a write access count 308a for each data element (e.g., track) that resides in the higher performance portion 218a. The read access count 306a may be incremented each time the data element is read in the higher performance portion 218a. The write access count 308a may be incremented each time the data element is modified in the higher performance portion 218a.

Similarly, the lower performance portion 218b may also include a cache directory 300b, LRU list 302b, and statistics 304b. The cache directory 300b may record which data elements are stored in the lower performance portion 218b and where they are stored. The LRU list 302b may be used to determine which data element is the least recently used in the lower performance portion 218b. The statistics 304b may include a read access count 306b and write access count 308b for each data element (e.g., track) in the lower performance portion 218b. The read access count 306b may be incremented each time the corresponding data element is read in the lower performance portion 218b. The write access count 308b may be incremented each time the corresponding data element is modified in the lower performance portion 218b.

Figure 4:
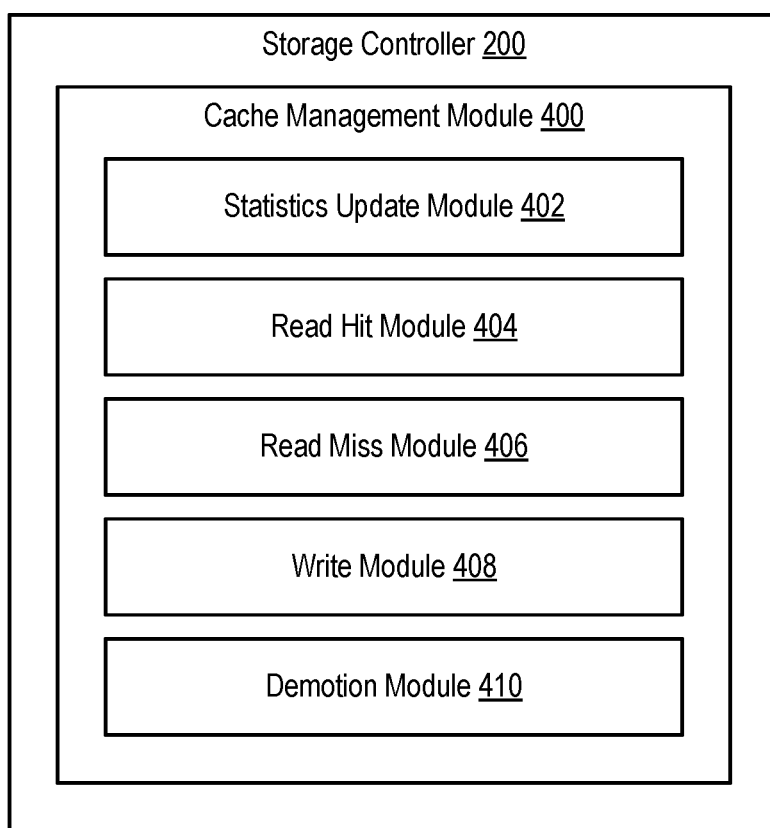
FIG. 4 is a high-level block diagram showing a cache management module in accordance with the invention.

Referring to FIG. 4, in certain embodiments, a cache management module 400 may be used to manage a heterogeneous cache 218 such as that illustrated in FIG. 3. Such a cache management module 400 may be hosted within the storage controller 200. The cache management module 400 may include various sub-modules to provide various features and functions. These modules may be implemented in hardware, software, firmware, or combinations thereof. The cache management module 400 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache management module 400 includes one or more of a statistics update module 402, read hit module 404, read miss module 406, write module 408, and demotion module 410. The statistics update module 402 maintains the statistics 304 associated with the heterogeneous cache 218. For example, each time a data element is read in the heterogeneous cache 218, the statistics update module 402 updates the associated read access count 306. Similarly, each time a data element is updated in the heterogeneous cache 218, the statistics update module 402 updates the associated write access count 308.

The read hit module 404 performs various actions when a read hit occurs in the heterogeneous cache 218. This may include either a read hit in the higher performance portion 218a or a read hit in the lower performance portion 218b. Several methods 500, 600, 700 that may be executed by the read hit module 404 will be discussed in association with FIGS. 5 through 7. By contrast, the read miss module 406 may perform various actions when a read miss occurs in the heterogeneous cache 218. One embodiment of a method 800 that may be executed by the read miss module 406 will be discussed in association with FIG. 8.

The write module 408 may perform various actions when data elements are updated in the heterogeneous cache 218. One embodiment of a method 900 that may be executed by the write module 408 will be discussed in association with FIG. 9. The demotion module 410, by contrast, may perform actions associated with demoting data elements from the heterogeneous cache 218 in order to clear storage space in the heterogeneous cache 218. Various methods 1000, 1100 that may be executed by the demotion module 410 will be discussed in association with FIGS. 10 and 11.

Figure 5:
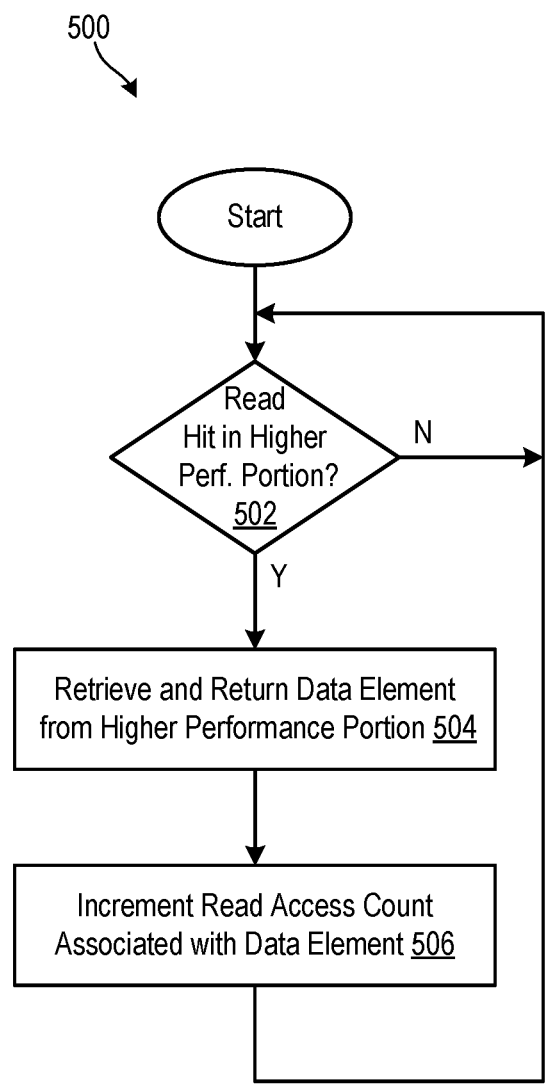
FIG. 5 is a flow diagram showing one embodiment of a method that may be executed in response to a read hit in the higher performance portion.

Referring to FIG. 5, one embodiment of a method 500 that may be executed in response to a read hit in the higher performance portion 218a of the heterogeneous cache 218 is illustrated. As shown, the method 500 determines 502 whether a read hit occurred in the higher performance portion 218a. That is, the method 500 determines 502 whether, in response to a read I/O request, a data element associated with the read I/O request was found in the higher performance portion 218a. If so, the method 500 retrieves 504 and returns 504 the data element from the higher performance portion 218a to an originator of the read request. The method 500 increments 506 the read access count 306a associated with the data element in response to the read hit.

Figure 6:
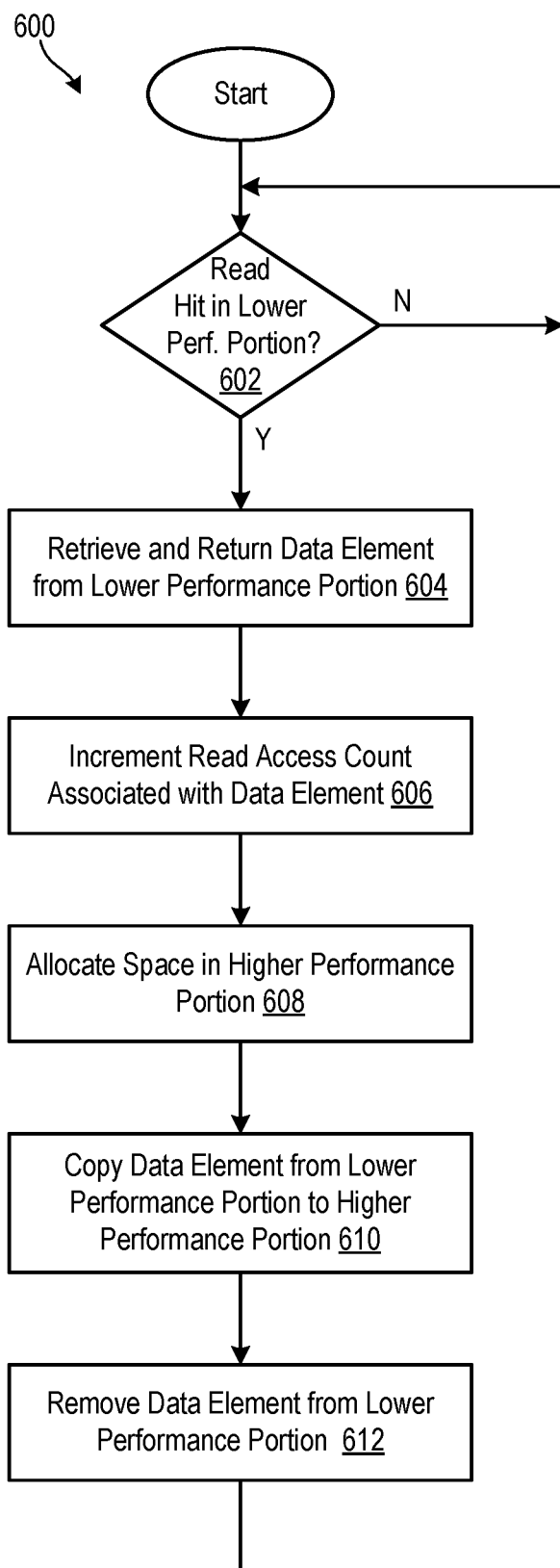
FIG. 6 is a flow diagram showing one embodiment of a method that may be executed in response to a read hit in the lower performance portion.

Referring to FIG. 6, one embodiment of a method 600 that may be executed in response to a read hit in the lower performance portion 218b is illustrated. As shown, the method 600 determines 602 whether a read hit occurred in the lower performance portion 218b of the heterogeneous cache 218. If so, the method 600 retrieves 604 and returns 604 a data element associated with the read request from the lower performance portion 218b to an originator of the read request. The method 600 then increments 606 the read access count 306b associated with the data element.

In response to the read hit, the method 600 also allocates 608 space in the higher performance portion 218a that is sufficient to accommodate the data element. In certain embodiments, this may include clearing space in the higher performance portion 218a by demoting a least recently used data element from the higher performance portion 218a. The method 600 then copies 610 the data element associated with the read request from the lower performance portion 218b to the higher performance portion 218a. The data element may then be removed 612 from the lower performance portion 218b. This may leave a single copy of the data element in the higher performance portion 218a.

Figure 7:
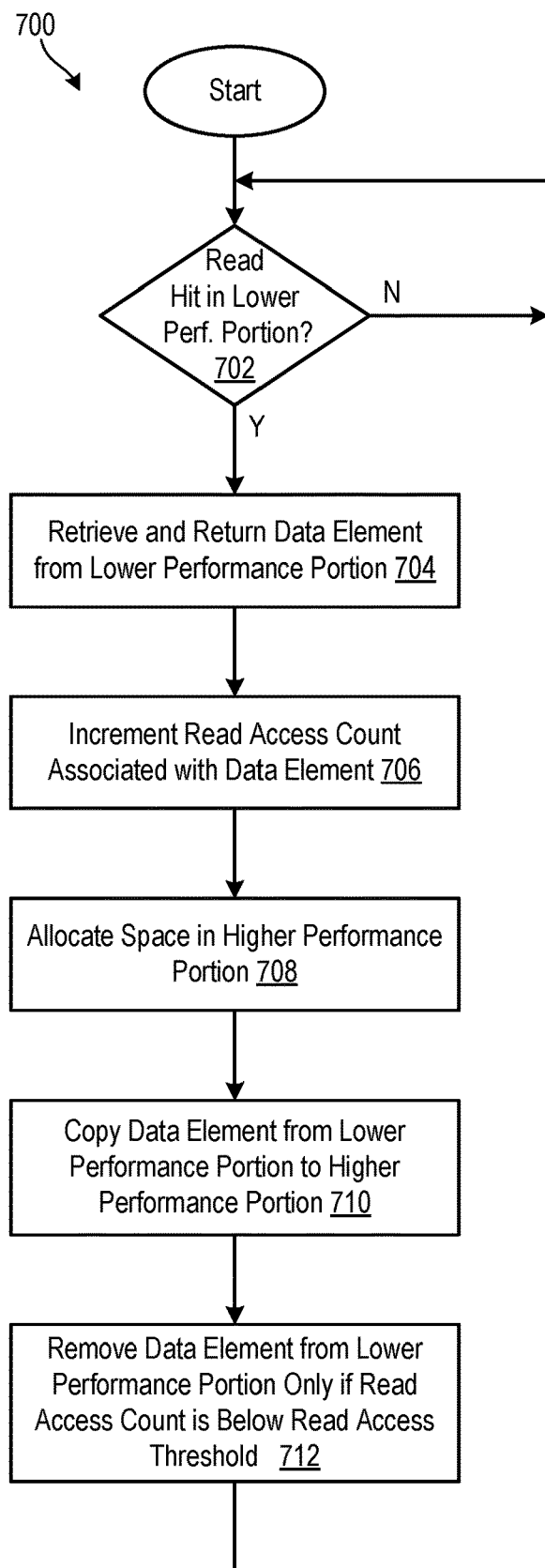
FIG. 7 is a flow diagram showing an alternative embodiment of a method that may be executed in response to a read hit in the lower performance portion.

Referring to FIG. 7, an alternative embodiment of a method 700 that may be executed in response to a read hit in the lower performance portion 218b is illustrated. This method 700 may be executed in place of the method 600 of FIG. 6. Each of the steps 702, 704, 706, 708, 710, are similar or identical to those disclosed in FIG. 6 except for the final step 712. In step 712, the alternative method 700 removes 712 the data element from the lower performance portion 218b only if the read access count 306b associated with the data element is below a selected threshold. This step 712 preserves a second copy of the data element in the lower performance portion 218b if the data element is read frequently. In the event the data element is demoted from the higher performance portion 218a at a future point in time, a copy of the data element will still reside in the lower performance portion 218b. This eliminates or reduces the need to copy the data element from the higher performance portion 218a to the lower performance portion 218b when the data element is demoted, which reduces processor utilization.

Figure 8:
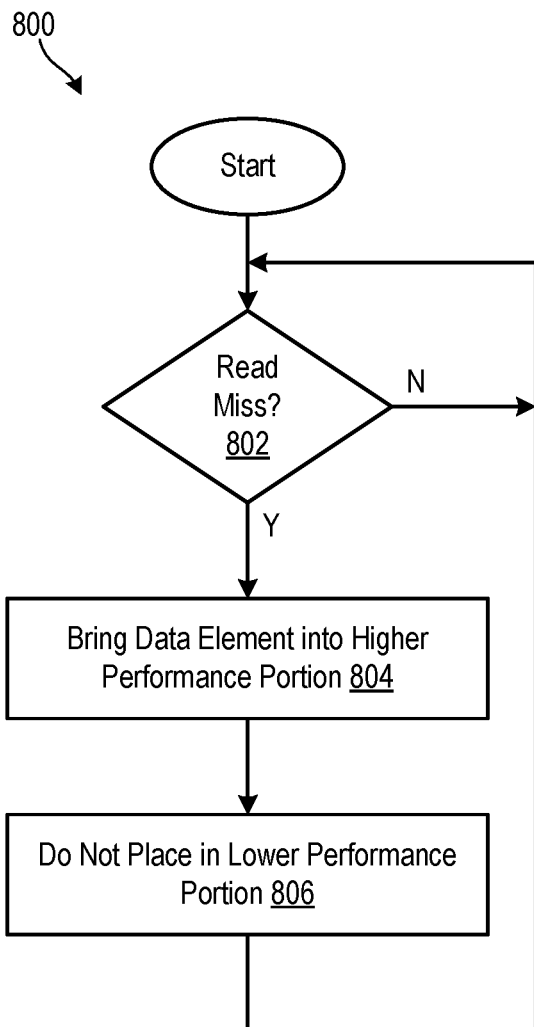
FIG. 8 is a flow diagram showing one embodiment of a method that may be executed in response to a read miss.

Referring to FIG. 8, one embodiment of a method 800 that may be executed in response to a read miss is illustrated. A read miss may occur when a requested data element cannot be found in either the higher performance portion 218a or the lower performance portion 218b of the heterogeneous cache 218. As shown, if a read miss occurs at step 802, the method 800 brings 804 the data element into the higher performance portion 218 of the heterogeneous cache 218 from backend storage drives 204. The method 800 does not place 806 the data element in the lower performance portion 218b at this time.

Figure 9:
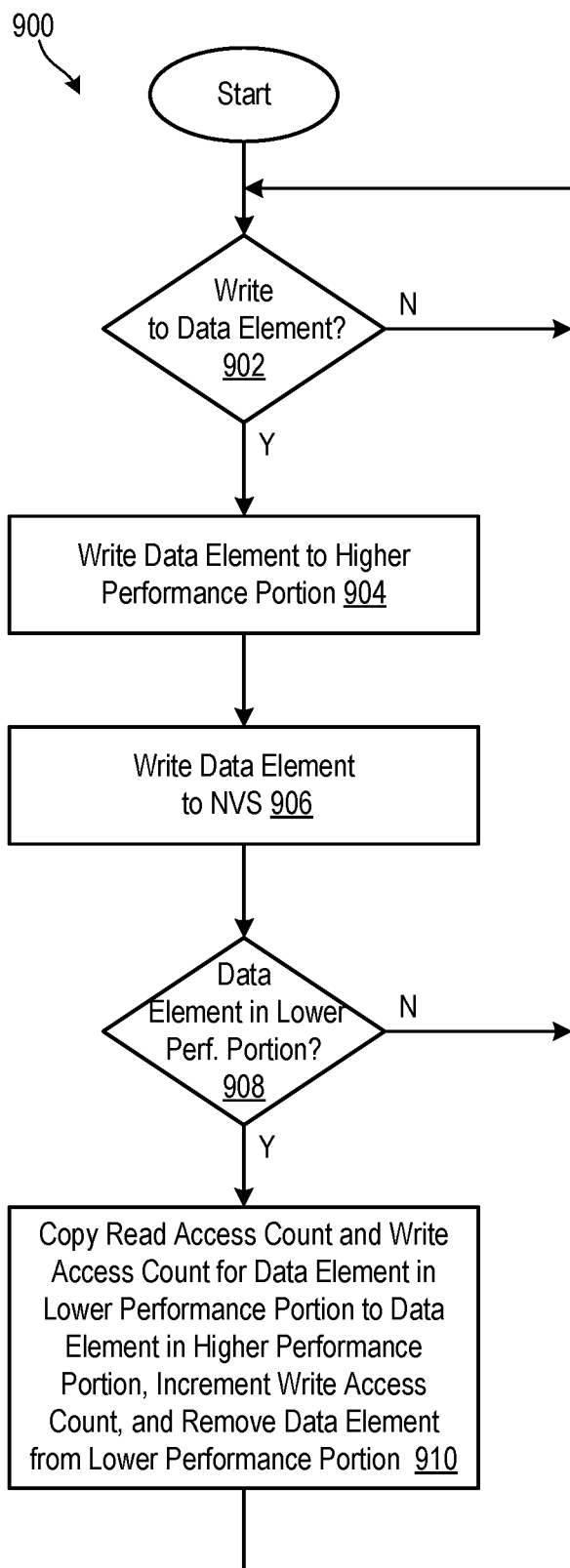
FIG. 9 is a flow diagram showing one embodiment of a method that may be executed in response to a write.

Referring to FIG. 9, one embodiment of a method 900 that may be executed in response to updating a data element in the heterogeneous cache 218 is illustrated. As shown, the method 900 determines 902 whether a write to a data element is requested. If so, the method 900 writes 904 the data element to the higher performance portion 218a of the heterogeneous cache 218. The method 900 also writes 906 the data element to the NVS 220 for purposes of redundancy as was previously described.

At this point, the method 900 determines 908 whether the data element (or a previous version thereof) is contained in the lower performance portion 218b. If the data element is stored in the lower performance portion 218b, the method 900 copies 910 statistics 304b (i.e., the read access count 306b and write access count 308b) associated with the data element from the lower performance portion 218b to the higher performance portion 218a, and increments the write access count 308a. The method 900 then removes 910 the data element from the lower performance portion 218b.

Figure 10:
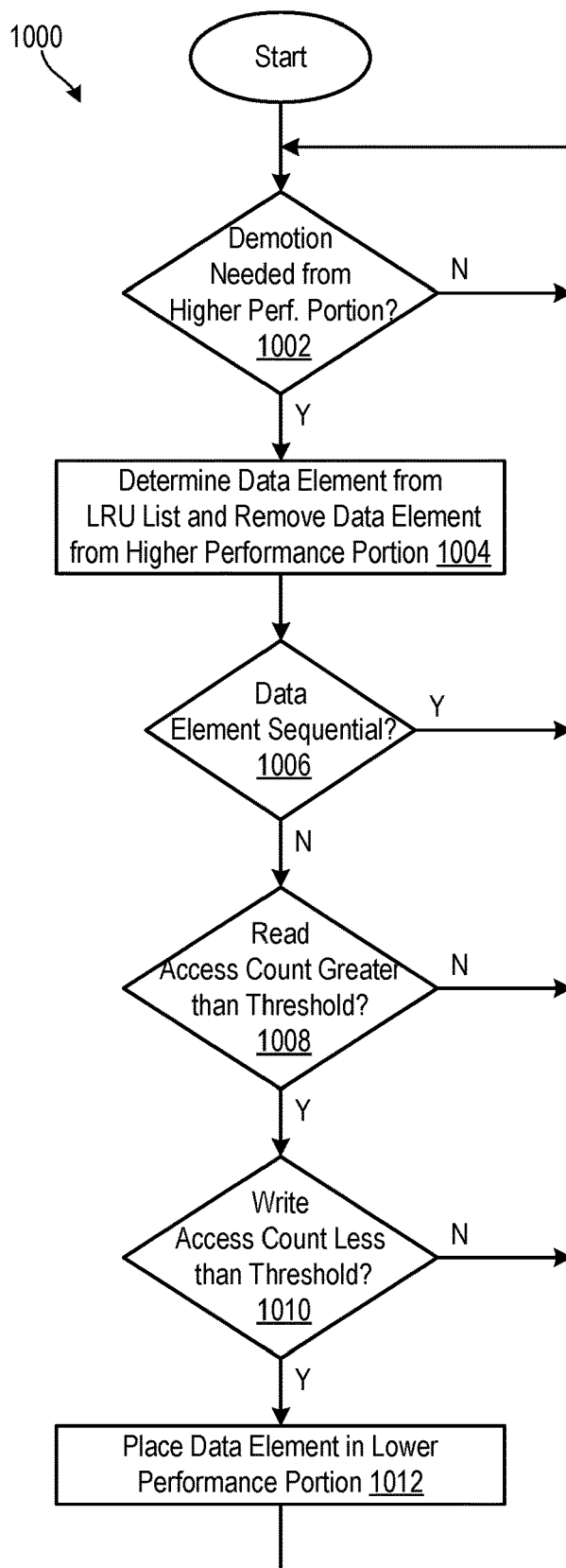
FIG. 10 is a flow diagram showing one embodiment of a method that may be executed when a data element is demoted from the higher performance portion.

Referring to FIG. 10, one embodiment of a method 1000 that may be executed when a data element is demoted (i.e., evicted) from the higher performance portion 218a is illustrated. Such a demotion may occur when space is needed in the higher performance portion 218a to accommodate additional data elements. As shown, the method 1000 initially determines 1002 whether data needs to be demoted from the higher performance portion 218a. If so, the method 1000 analyzes the LRU list 302a associated with the higher performance portion 218a to determine 1004 the least recently used data element that is in line to be removed from the higher performance portion 218a. The method 1000 then removes 1004 this data element from the higher performance portion 218a.

At this point, the method 1000 determines 1006 whether the data element that was removed from the higher performance portion 218a is sequential data. If so, nothing further is performed since it would be disadvantageous to add sequential data to the lower performance portion 218b. If the data element is not sequential, the method 1000 determines 1008 whether the read access count 306a associated with the data element is greater than a specified threshold and determines 1010 whether the write access count 308a associated with the data element is less than a specified threshold. If both of these conditions are true, the method 1000 places 1012 the data element that was demoted from the higher performance portion 218a in the lower performance portion 218b. In essence, the method 1000 places 1012 data elements in the lower performance portion 218b if the data elements are read frequently (thereby enhancing future read performance for the data elements) but written to infrequently since excessive writes to the data elements may place excessive wear on the lower performance portion 218b.

Figure 11:
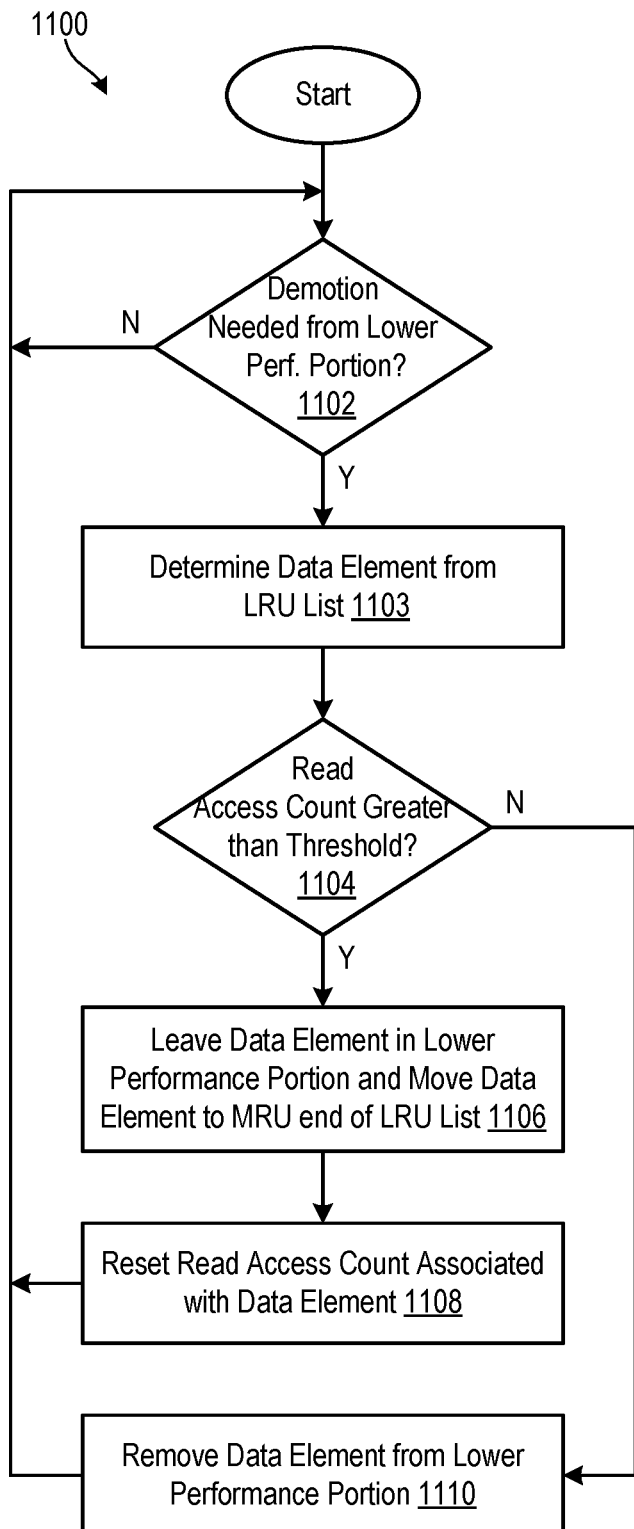
FIG. 11 is a flow diagram showing one embodiment of a method that may be executed when a data element is demoted from the lower performance portion.

Referring to FIG. 11, one embodiment of a method 1100 that may be executed when a data element is demoted (i.e., evicted) from the lower performance portion 218b is illustrated. Such a demotion may occur when space is needed in the lower performance portion 218b. As shown, the method 1100 initially determines 1102 whether data needs to be demoted from the lower performance portion 218b. If so, the method 1100 analyzes the LRU list 302b associated with the lower performance portion 218b to determine 1103 which data element is in line to be removed from the lower performance portion 218b.

At this point, the method 1100 determines 1104 whether the read access count 306b for the data element that is in line to be removed is greater than a threshold (to determine if the data element is read frequently). If the read access count 306b is above the threshold, the method 1100 leaves 1106 the data element in the lower performance portion 218b and moves a reference to the data element to the MRU (most recently used) end of the LRU list 302b. In other words, the method 1100 does not remove the data element from the lower performance portion 218b since it is determined to be read frequently and would benefit from being retained in the lower performance portion 218b. The method 1100 also resets 1108 (e.g., sets to zero) the read access count 306b associated with the data element. The method 1100 then returns to the top (i.e., step 1102) where it may analyze the next data element in line to be removed from the lower performance portion 218b. On the other hand, if, at step 1104, the read access count 306b associated with the data element is not above the threshold, the method 1100 removes 1110 the data element from the lower performance portion 218b.

Figure 12:
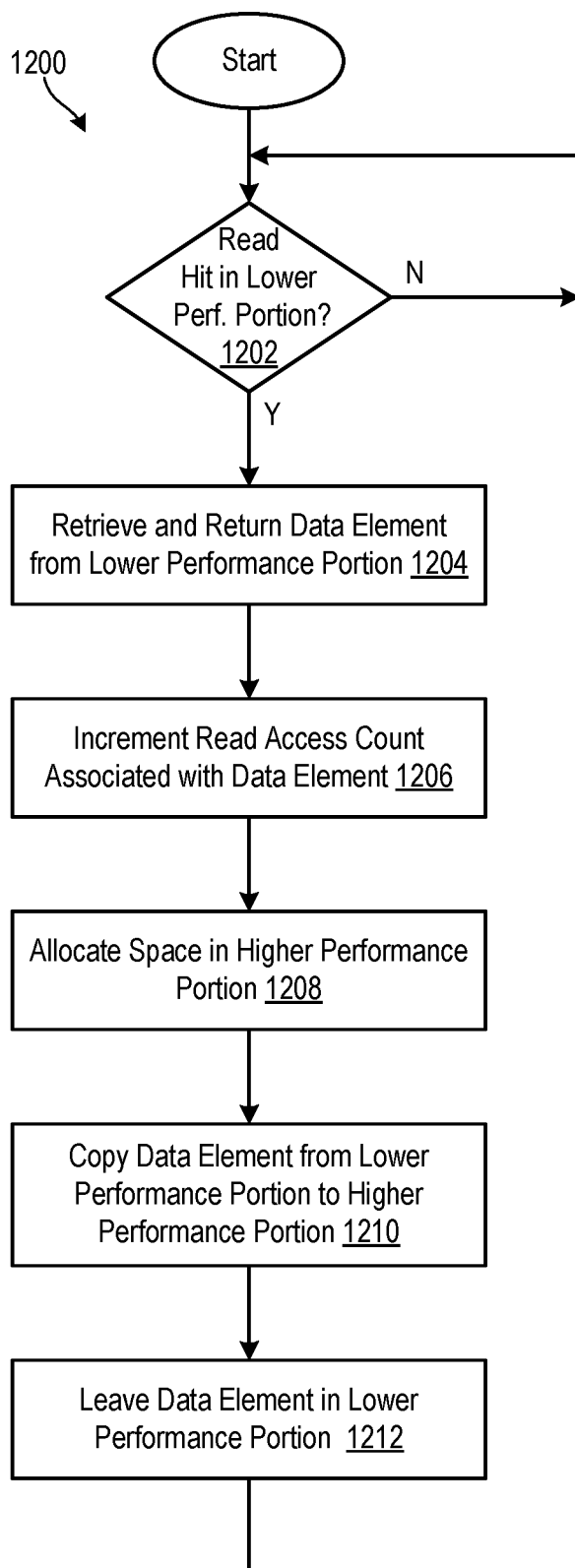
FIG. 12 is a flow diagram showing an alternative embodiment of a method that may be executed in response to a read hit in the lower performance portion.
Figure 13:
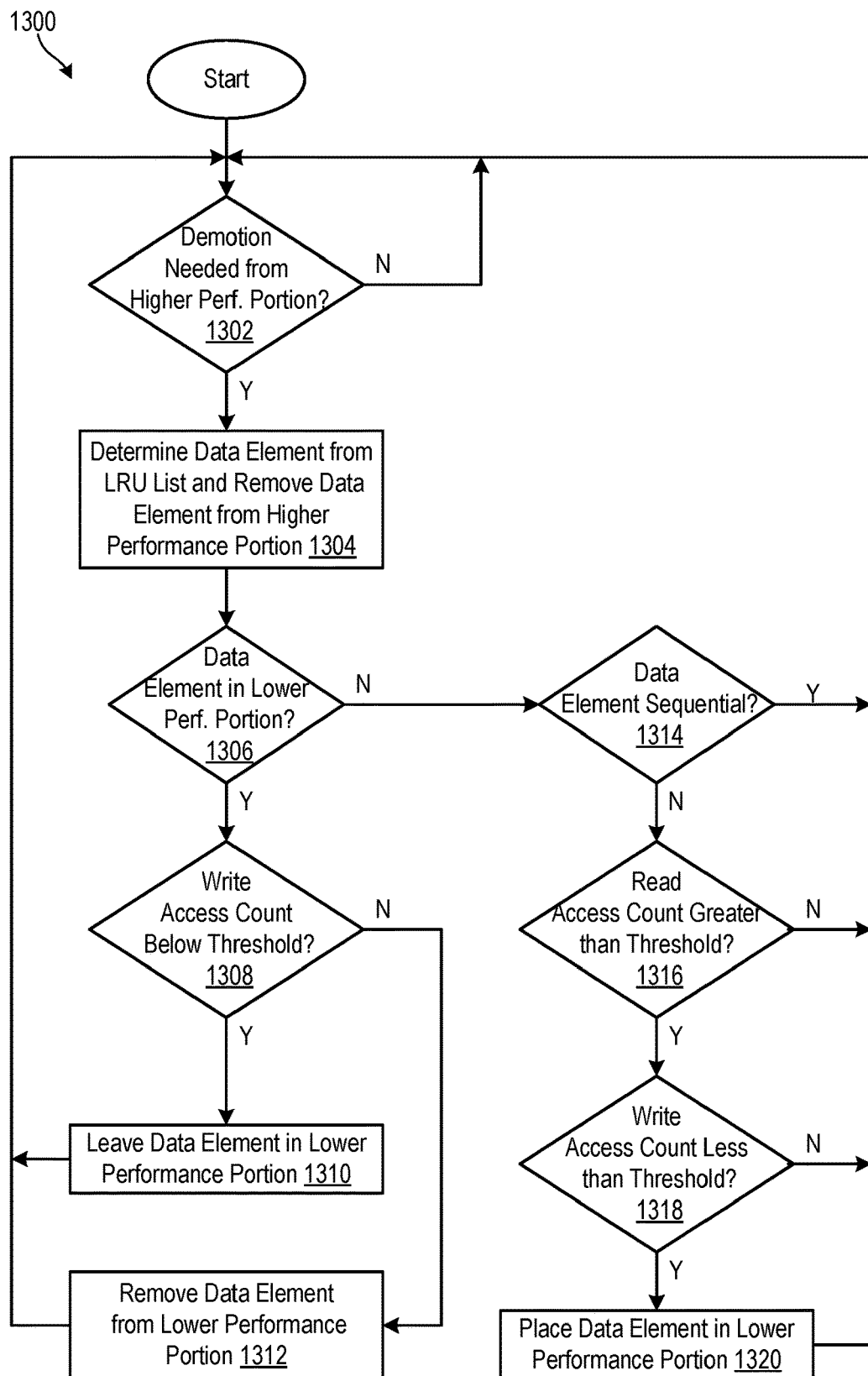
FIG. 13 is a flow diagram showing an alternative embodiment of a method that may be executed when a data element is demoted from the higher performance portion.

Referring generally to FIGS. 12 and 13, as was previously mentioned, the methods illustrated in FIGS. 5 through 11 are generally configured to maintain a single copy of a data element in the heterogeneous cache 218. That is, if a data element resides in the higher performance portion 218a, it will generally not reside in (or will be removed from) the lower performance portion 218b, and vice versa. This provides the best overall cache capacity at the expense of having to copy data elements from the higher performance portion 218a to the lower performance portion 218b when data elements are demoted from the higher performance portion 218a, which may increase processor utilization. Thus, a tradeoff exists between cache capacity and processor utilization.

In certain embodiments, the methods illustrated in FIGS. 5 through 11 may be modified to maintain, for the most part, a copy of a data element in both the higher performance portion 218a and the lower performance portion 218b. Although this may reduce overall cache storage capacity, it may advantageously reduce processor utilization by reducing the need to copy data elements between the higher performance portion 218a and the lower performance portion 218b.

FIG. 12 is a flow diagram showing an alternative method 1200 that may be executed in response to a read hit in the lower performance portion 218b. This method 1200 may be executed in environments where duplicate copies of data elements are maintained in the higher performance portion 218a and the lower performance portion 218b. This method 1200 may be used to replace the method 600 described in FIG. 6, which may be used in environments where only a single copy is maintained. As shown, the method 1200 determines 1202 whether a read hit has occurred in the lower performance portion 218b. If so, the method 1200 retrieves 1204 and returns 1206 a data element associated with the read request from the lower performance portion 218b to an originator of the read request. The method 1200 increments 1206 the read access count 306b associated with the data element.

In response to the read hit, the method 1200 allocates 1208 space in the higher performance portion 218a that is sufficient to accommodate the data element. The method 1200 then copies 1210 the data element associated with the read request from the lower performance portion 218b to the higher performance portion 218a. The data element may be left 1212 in the lower performance portion 218b. This may provide duplicate copies of the data element in the higher performance portion 218a and the lower performance portion 218b.

FIG. 13 is a flow diagram showing an alternative method 1300 that may be executed when a data element is demoted from the higher performance portion 218a. This method 1300 may also be executed in environments where duplicate copies of data elements are maintained in the higher performance portion 218a and the lower performance portion 218b. This method 1300 may be used to replace the method 1000 described in FIG. 10, which may be used in environments where only a single copy is maintained. As shown, the method 1300 initially determines 1302 whether data needs to be demoted from the higher performance portion 218a. If so, the method 1300 analyzes the LRU list 302a associated with the higher performance portion 218a to determine 1304 which data element is in line to be removed from the higher performance portion 218a. The method 1300 then removes 1304 this data element from the higher performance portion 218a.

The method 1300 then determines 1306 whether the data element that was removed from the higher performance portion 218a also resides in the lower performance portion 218b. If so, the method 1300 determines 1308 whether a write access count 308b associated with the data element is below a threshold. In essence, this step 1308 determines whether the data element is updated frequently. If the data element is not updated frequently (i.e., the write access count 308b for the data element is below the threshold), the data element is left 1310 in the lower performance portion 218b since the data element will not place excessive wear on the lower performance portion 218b. On the other hand, if the data element is updated frequently (i.e., the write access count 308b for the data element is above the threshold), the method 1300 removes 1312 the data element from the lower performance portion 218b.

If, at step 1306, the data element is not in the lower performance portion 218b, the method 1300 determines 1314 whether the data element that was removed from the higher performance portion 218a is sequential data. If so, nothing is changed since it would not be advantageous to add the data element to the lower performance portion 218b. If the data element is not sequential, the method 1300 determines 1316 whether a read access count 306b associated with the data element is greater than a specified threshold and determines 1318 whether a write access count 308b associated with the data element is less than a specified threshold. If so, the method 1300 places 1320 the data element that was demoted from the higher performance portion 218a in the lower performance portion 218b. In essence, the method 1300 places 1320 demoted data elements in the lower performance portion 218b if the data elements are read frequently (thereby enhancing future read performance for the data elements) but not updated frequently since excessive writes may place excessive wear on the lower performance portion 218b if it is implemented in a memory type (e.g., SCM) having write cycle limits. When placing 1320 the demoted data element in the lower performance portion 218b, the method 2100 may place the data element in the appropriate ghost cache LRU list 1406 based on its statistics 1408.

Figure 14:
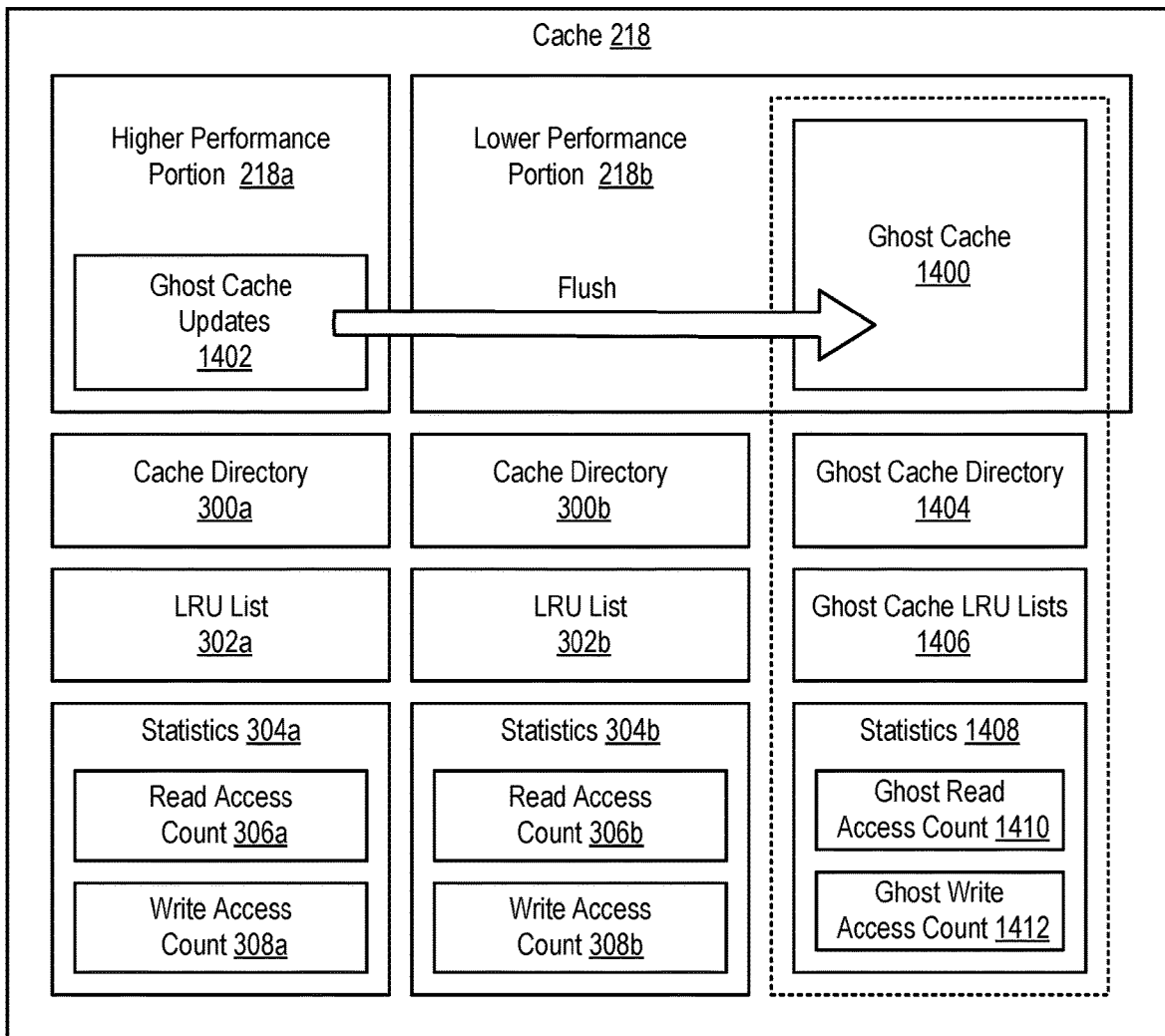
FIG. 14 is a high-level block diagram showing a ghost cache maintained within a lower performance portion of the cache.

Referring to FIG. 14, in certain cases, it may be desirable to maintain access statistics (e.g., read access counts, write access counts, etc.) not only for data elements that are contained in the heterogeneous cache 218 but also for data elements that have been demoted from the heterogeneous cache 218 within a specified time interval (e.g., an hour, several hours, a day, etc.). For example, some data elements may be staged into cache 218, accessed, and then demoted from the cache 218 in a fairly short time period. When demoted, statistics, such as the read access counts 306 and/or write access counts 308 previously discussed herein, may be lost. When the same data elements are brought back into the cache 218, no statistics may exist and the statistics (e.g., read access counts 306, write access counts 308, etc.) may need to be regathered and accumulated over time. Since accurate statistics are not available, it may be difficult to prioritize data elements that are brought back into the cache 218 to maximize cache hit ratios.

To address the issues set forth above, in certain embodiments, a ghost cache 1400 may be established in the heterogeneous cache 218, such as in the lower performance portion 218b, to store statistics for data elements that are currently stored in the heterogeneous cache 218, as well as data elements that have been demoted from the heterogeneous cache 218 within a specified time interval. When recently demoted data elements are brought back into the cache 218, statistics may be available for the data elements in the ghost cache 1400, thereby allowing the data elements to be prioritized in the cache 218 to improve performance metrics such as cache hit ratios. For example, data elements that are read frequently may be retained in the cache 218 longer than data elements that are not read as frequently, and so forth.

As shown in FIG. 14, in certain embodiments, the ghost cache 1400 may include a ghost cache directory 1404 (e.g., hash table). The ghost cache directory 1404 may contain an entry for each data element stored in the heterogeneous cache 218 as well as data elements that have been demoted from the heterogeneous cache 218 in a past time interval. In certain embodiments, each entry may identify a data element (e.g., track) by volume identifier and data element number (e.g., track number) in the volume.

Because the lower performance portion 218b may be implemented using flash memory such as storage class memory (SCM), systems and methods in accordance with the invention may attempt to minimize writes to the ghost cache 1400 to reduce wear and tear on the lower performance portion 218b. Thus, in certain embodiments, updates 1402 to the ghost cache statistics 1400 may be maintained in the higher performance portion 218a. These updates 1402 may be periodically flushed to the ghost cache 1400, such as when the update area 1402 is full or a certain amount of time has passed. Flushing may include taking statistics 1408 for data elements from the update area 1400, finding the corresponding statistics 1408 in the ghost cache 1400 by locating the data element identifiers in the ghost cache directory 1404, and overwriting the statistics 1408 associated with the data elements. This will allow frequent updates 1402 to the ghost cache statistics 1408 in the higher performance portion 218a while minimizing or reducing a number of writes to the ghost cache 1400 in the lower performance portion 218b.

As shown in FIG. 14, statistics 1408 may be maintained for each data element that is referenced in the ghost cache directory 1404. These statistics 1408 may include a ghost read access count 1410 and ghost write access count 1412 for each data element. The ghost read access count 1410 may be incremented each time the associated data element is read. The ghost read access count 1410 may be set to zero each time the associated data element is brought into the higher performance portion 218a. The ghost write access count 1412 may be incremented each time the associated data element is updated. The ghost write access count 1412 may be set to zero each time the associated data element is brought into the higher performance portion 218a.

As shown, in certain embodiments, the ghost cache 1400 includes one or more ghost cache LRU lists 1406. When data is demoted from the lower performance portion 218b, the ghost cache LRU lists 1406 may be used to determine an order in which data elements are demoted from the lower performance portion 218b. One example of a set ghost cache LRU lists 1406 that may be used with the ghost cache 1400 is illustrated in FIG. 15.

Figure 15:
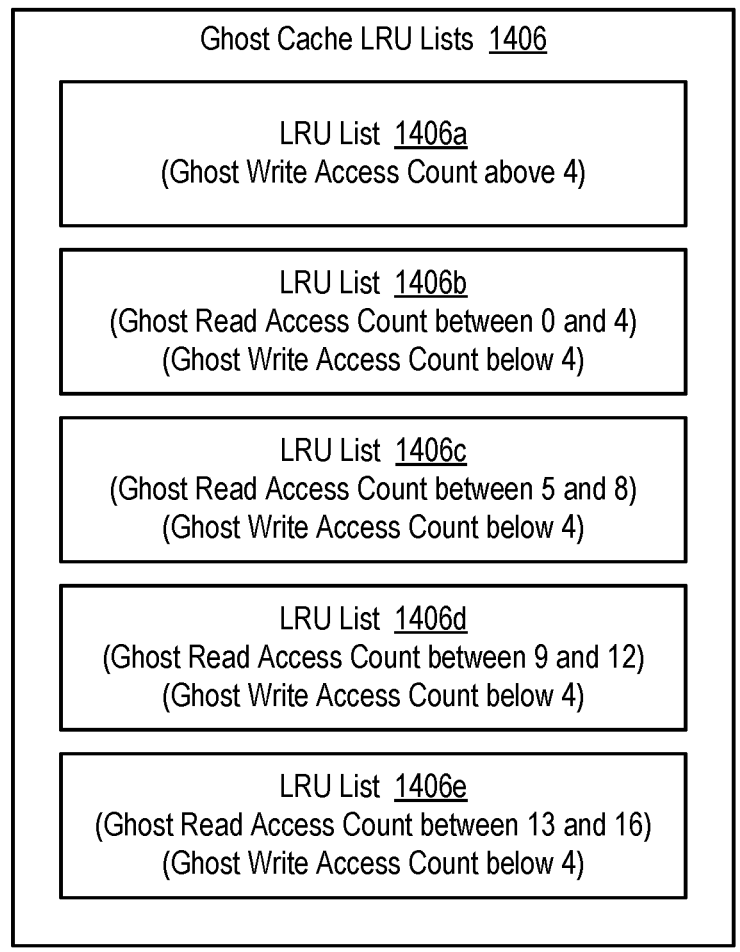
FIG. 15 is a high-level block diagram showing exemplary LRU lists utilized in association with the ghost cache.

Referring to FIG. 15, various ghost cache LRU lists 1406 that may be utilized in association with the ghost cache 1400 are illustrated. As shown, data elements may be assigned to one of the ghost cache LRU lists 1406 based on their ghost read access counts 1410 and ghost write access counts 1412. As their ghost read access counts 1410 and ghost write access counts 1412 change over time, the data elements may be moved between the ghost cache LRU lists 1406.

In the illustrated example, the ghost cache LRU lists 1406 include a first ghost cache LRU list 1406a that references data elements with a ghost write access count 1412 above four, a second ghost cache LRU list 1406b that references data elements with a ghost read access count 1410 between zero and four and a ghost write access count 1412 below four, a third ghost cache LRU list 1406c that references data elements with a ghost read access count 1410 between five and eight and a ghost write access count 1412 below four, a fourth ghost cache LRU list 1406d that references data elements with a ghost read access count 1410 between nine and twelve and a ghost write access count 1412 below four, and a fifth ghost cache LRU list 1406e that references data elements with a ghost read access count 1410 between thirteen and sixteen and a ghost write access count 1412 below four. These ghost cache LRU lists 1406 form a sequence from top to bottom.

When space needs to be cleared in the lower performance portion 218b, the ghost cache LRU lists 1406 may be used to determine which data element are demoted from the lower performance portion 218b. In general, when a data element needs to be demoted, a cache demotion algorithm may demote the first data element that is encountered in a non-empty ghost cache LRU list 1406 in the sequence. For example, the cache demotion algorithm will demote the data element at the LRU end of the ghost cache LRU list 1406a in the event the ghost cache LRU list 1406a is not empty. If the ghost cache LRU list 1406a is empty, the cache demotion algorithm will demote the data element from the LRU end of the ghost cache LRU list 1406b in the event the ghost cache LRU list 1406b is not empty. If the ghost cache LRU list 1406b is empty, the cache demotion algorithm will demote the data element from the LRU end of the ghost cache LRU list 1406c in the event the ghost cache LRU list 1406c is not empty, and so forth. As the ghost read access counts 1410 and ghost write access counts 1412 for data elements change, the data elements may be moved between the ghost cache LRU lists 1406 as necessary.

As can be observed from FIG. 15, the cache demotion algorithm first demotes data elements with high ghost write access counts 1412 since these data elements are updated frequently and will place significant wear and tear on the lower performance portion 218b (which, as previously explained, may have write-cycle limits). The cache demotion algorithm then prioritizes data elements with higher read counts over data elements with lower read counts such that data elements with lower read counts are demoted from the lower performance portion 218b prior to data elements with higher read counts. This will retain, as much as possible, data elements in the lower performance portion 218b that are read often but not updated often. Advantageously, this technique may enable lower performance memory, such as flash memory and more specifically SCM, to be effectively incorporated into cache, thereby providing improvements over the prior art.

Figure 16:
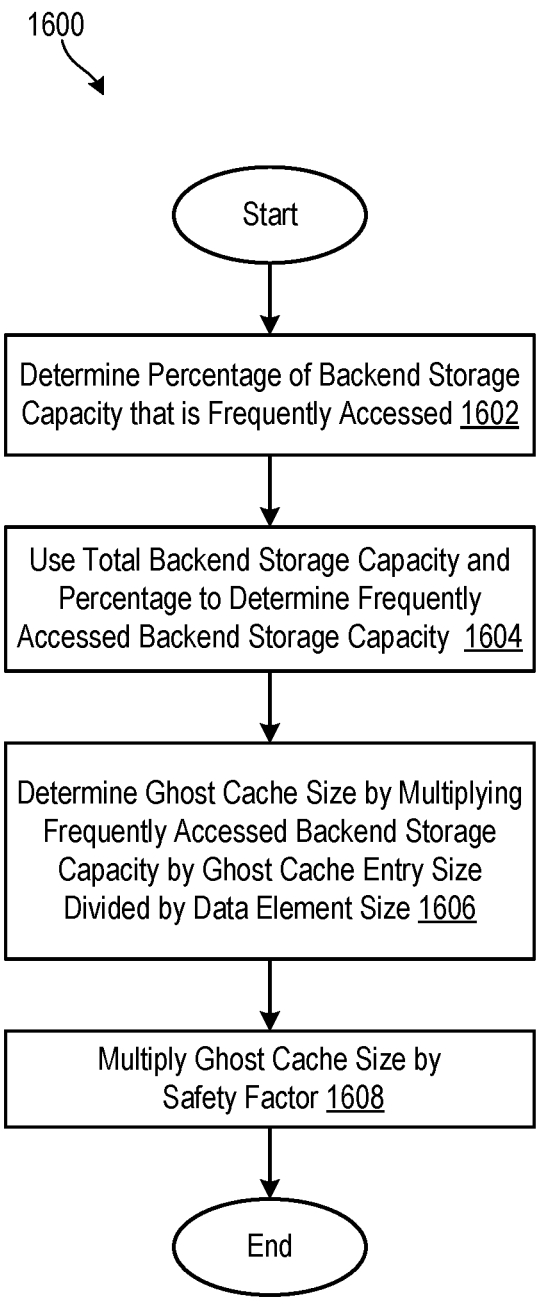
FIG. 16 is a flow diagram showing one embodiment of a method for calculating and adjusting a ghost cache size in accordance with an amount of frequently accessed data.

Referring to FIG. 16, in order to store statistics 1408 for data elements that are currently in the cache 218 as well as those that have been demoted from the cache 218 in a specified time interval, the ghost cache 1400 may be sized to accommodate the statistics 1408. In certain embodiments, for each data element, an amount of storage space is allocated in the ghost cache 1400 to store a data element identifier (e.g., a track identifier), a ghost read access count 1410, and a ghost write access count 1412. Thus, the ghost cache 1400 needs to be sized to store this information for each data element currently in the cache 218 or demoted within a last time interval. For the purposes of this disclosure, data elements that are currently in the cache 218 or demoted within a last time interval may be referred to as "frequently accessed data."

FIG. 16 shows one embodiment of a method 1600 for calculating and adjusting a ghost cache size in accordance with an amount of frequently accessed data. In one embodiment, the method 1600 determines 1602 a percentage of data in backend storage drives 204 that qualifies as "frequently accessed data." Using a total storage capacity of the backend storage drives 204 and the percentage calculated at step 1602, the method 1600 determines 1604 an amount of the backend storage capacity that is frequently accessed. The method 1600 then determines 1606 the size of the ghost cache 1400 by multiplying the backend storage capacity that is frequently accessed by the ghost cache 1400 entry size (i.e., the amount of storage space that is needed in the ghost cache 1400 to store a data element identifier, ghost read access count 1410, and ghost write access count 1412), divided by the data element size (e.g., track size). This will yield the required size of the ghost cache 1400 to store entries for frequently accessed data elements.

In certain embodiments, the method 1600 multiplies 1608 the calculated ghost cache size by a safety factor to ensure that the ghost cache 1400 does not run out of space. For example, if the ghost cache size calculated at step 1606 is twenty gigabytes, this number may be multiplied by a safety factor of 1.5 to yield thirty gigabytes. Thirty gigabytes may then be allocated to the ghost cache 1400 in the lower performance portion 218b. As data access patterns change, the amount of frequently accessed data elements in the backend storage drives 204 may also change. Thus, the method 1600 may be periodically re-executed to resize the ghost cache 1400 to correspond to an amount of frequently accessed data in the backend storage drives 204. Thus, the size of the ghost cache 1400 may be dynamic rather than static.

When using the ghost cache 1400, a read hit in the higher performance portion 218a may, in certain embodiments, be processed in the same way described in association with FIG. 5, except that incrementing 506 the read access count 306a may also include incrementing the ghost read access count 1410. Similarly, a read hit in the lower performance portion 218b may be processed in the same way as described in association with FIG. 6 or 7, except that incrementing 506 the read access count 306b may also include incrementing the ghost read access count 1410. Furthermore, when using the ghost cache 1400, a write may be processed in the same way as illustrated in FIG. 9, except that incrementing 910 the write access count 308a may also include incrementing the ghost write access count 1412.

Figure 17:
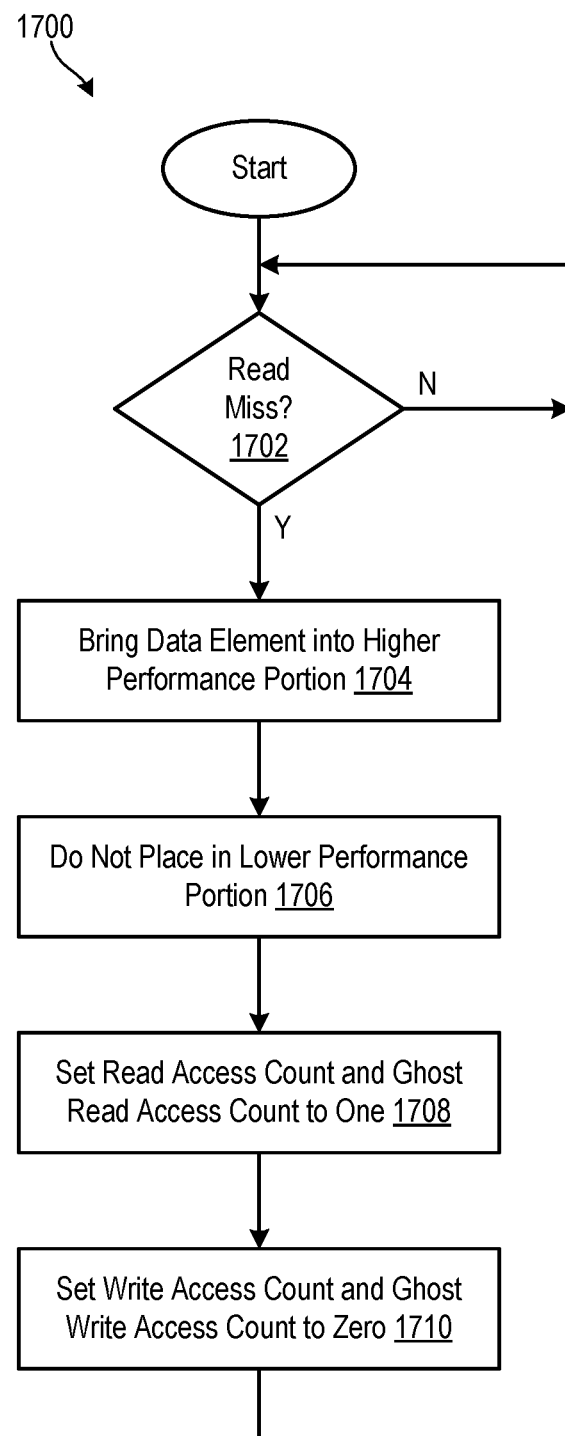
FIG. 17 is a flow diagram showing one embodiment of a method for handling a read miss in an environment using a ghost cache.

Referring to FIG. 17, one embodiment of a method 1700 for handling a read miss when using a ghost cache 1400 is illustrated. As shown, when a read miss occurs (i.e., a requested data element is not found in the higher performance portion 218a or the lower performance portion 218b) at step 1702, the method 1700 brings 1704 the requested data element into the higher performance portion 218a. The method 1700 does not place 1706 the data element in the lower performance portion 218b at this time. Upon bringing the data element into the higher performance portion 218a, the method 1700 sets 1708 the read access count 306a and ghost read access count 1410 to one (since the data element has just been read) and sets 710 the write access count 308a and ghost write access count 1412 to zero.

Figure 18:
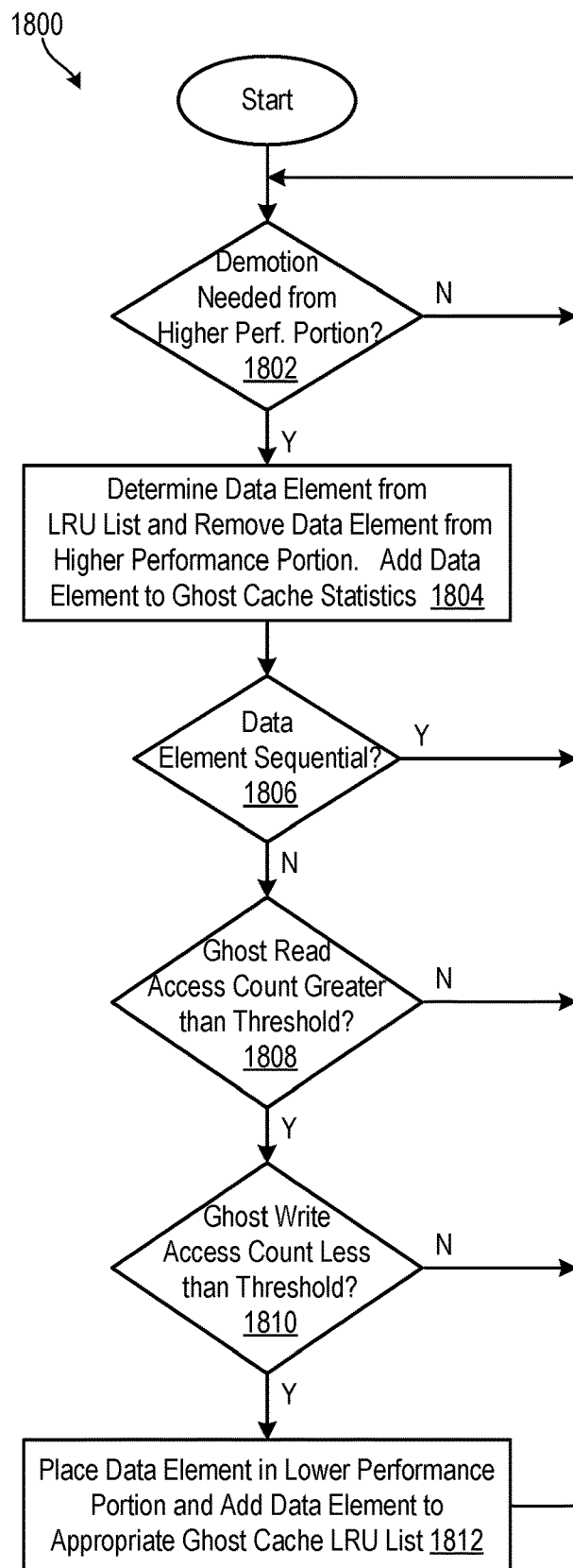
FIG. 18 is a flow diagram showing one embodiment of a method for demoting data from the higher performance portion in an environment using the ghost cache.

FIG. 18 is a flow diagram showing one embodiment of a method 1800 for demoting a data element from the higher performance portion 218a in an environment using a ghost cache 1400. Such a demotion may occur when space is needed in the higher performance portion 218a to accommodate additional data elements. As shown, the method 1800 initially determines 1802 whether data needs to be demoted from the higher performance portion 218a. If so, the method 1800 analyzes the LRU list 302a associated with the higher performance portion 218a to determine 1804 which data element is in line to be removed from the higher performance portion 218a. The method 1800 then removes 1804 this data element from the higher performance portion 218a.

At this point, the method 1800 determines 1806 whether the data element that was removed from the higher performance portion 218a is sequential data. If so, nothing further is performed since it would be disadvantageous to add sequential data to the lower performance portion 218b. If the data element is not sequential, the method 1800 determines 1808 whether the ghost read access count 1410 associated with the data element is greater than a specified threshold and the ghost write access count 1412 associated with the data element is less than a specified threshold. If both of these conditions are true, the method 1800 places 1812 the demoted data element in the lower performance portion 218b. In essence, the method 1800 places 1812 data elements in the lower performance portion 218b if the data elements are read frequently (thereby enhancing future read performance for the data elements) but written to infrequently since excessive writes to the data elements may place excessive wear and tear on the lower performance portion 218b.

Figure 19:
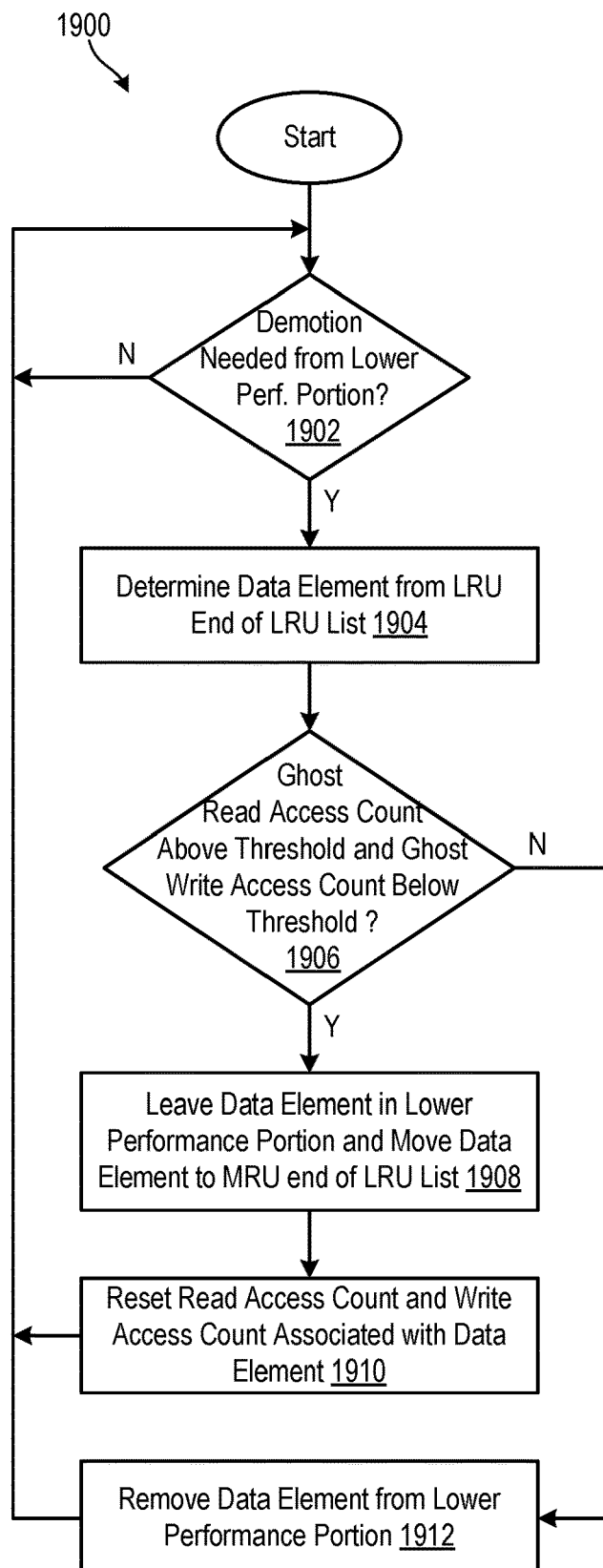
FIG. 19 is a flow diagram showing one embodiment of a method for demoting data from the lower performance portion in an environment using the ghost cache.

FIG. 19 is a flow diagram showing one embodiment of a method 1900 for demoting data from the lower performance portion 218b in an environment using the ghost cache 1400. Such a demotion may occur when space is needed in the lower performance portion 218b. As shown, the method 1900 initially determines 1902 whether data needs to be demoted from the lower performance portion 218b. If so, the method 1900 analyzes 1904 the LRU list 302b associated with the lower performance portion 218b to determine 1904 which data element is at the LRU end of the LRU list 302b and thus in line to be removed from the lower performance portion 218b.

At this point, the method 1900 determines 1906 whether the ghost read access count 1410 for the data element that is in line to be removed is greater than a threshold (to determine if the data element is read frequently) and the ghost write access count 1412 is below a threshold (to determine if the data element is updated infrequently). If the ghost read access count 1410 is above the threshold and the ghost write access count 1412 is below the threshold, the method 1900 leaves 1908 the data element in the lower performance portion 218b and moves the data element to the MRU (most recently used) end of the LRU list 302b. In other words, the method 1900 does not remove the data element from the lower performance portion 218b since it is read frequently and written to infrequently and would benefit from being retained in the lower performance portion 218b. The method 1900 also resets 1910 (i.e., sets to zero) the read access count 306b and write access count 308b associated with the data element. The method 1900 then returns to step 1902 where it may analyze the next data element in line to be removed from the lower performance portion 218b. On the other hand, if, at step 1906, the ghost read access count 1410 is not above the threshold and/or the ghost write access count 1412 is not below the threshold, the method 1900 removes 1912 the data element from the lower performance portion 218b.

Figure 20:
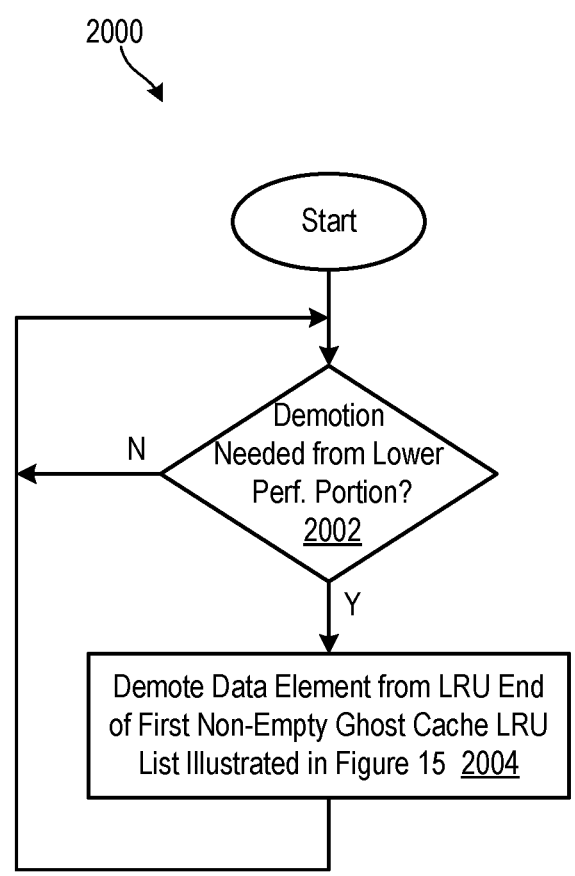
FIG. 20 is a flow diagram showing an alternative embodiment of a method for demoting data from the lower performance portion in an environment using the ghost cache.

FIG. 20 is a flow diagram showing an alternative method 2000 for demoting data from the lower performance portion 218b in an environment using a ghost cache 1400. As shown, the method 2000 initially determines 2002 whether data needs to be demoted from the lower performance portion 218b. If so, the method 2000 demotes 2004 a data element from the LRU end of the first non-empty ghost cache LRU list 1406 illustrated in FIG. 15. The ghost cache LRU lists 1406 illustrated in FIG. 15 are simply examples of divisions that may be made between ghost cache LRU lists 1406 based on ghost read access counts 1410 and ghost write access counts 1412. Other divisions are possible and within the scope of the invention.

In either of the methods 1900, 2000 illustrated in FIGS. 19 and 20, the possibility exists of working through a number of data elements at the LRU end of an LRU list without finding a data element that qualifies for demotion. To address such cases, methods may be put in place to ensure that some data elements are demoted from the lower performance portion 218b to clear space therein. For example, a method may allow some number of demotions out of the lower performance portion 218b to occur regardless of whether thresholds are met until the condition ends. Another technique is to update (e.g., increase) a ghost read access count threshold and update (e.g., decrease) a ghost write access count threshold (as shown in step 1906 of FIG. 19 for example) by some factor. This will allow data elements in a current LRU list to start to meet the criteria for demotion.

Figure 21:
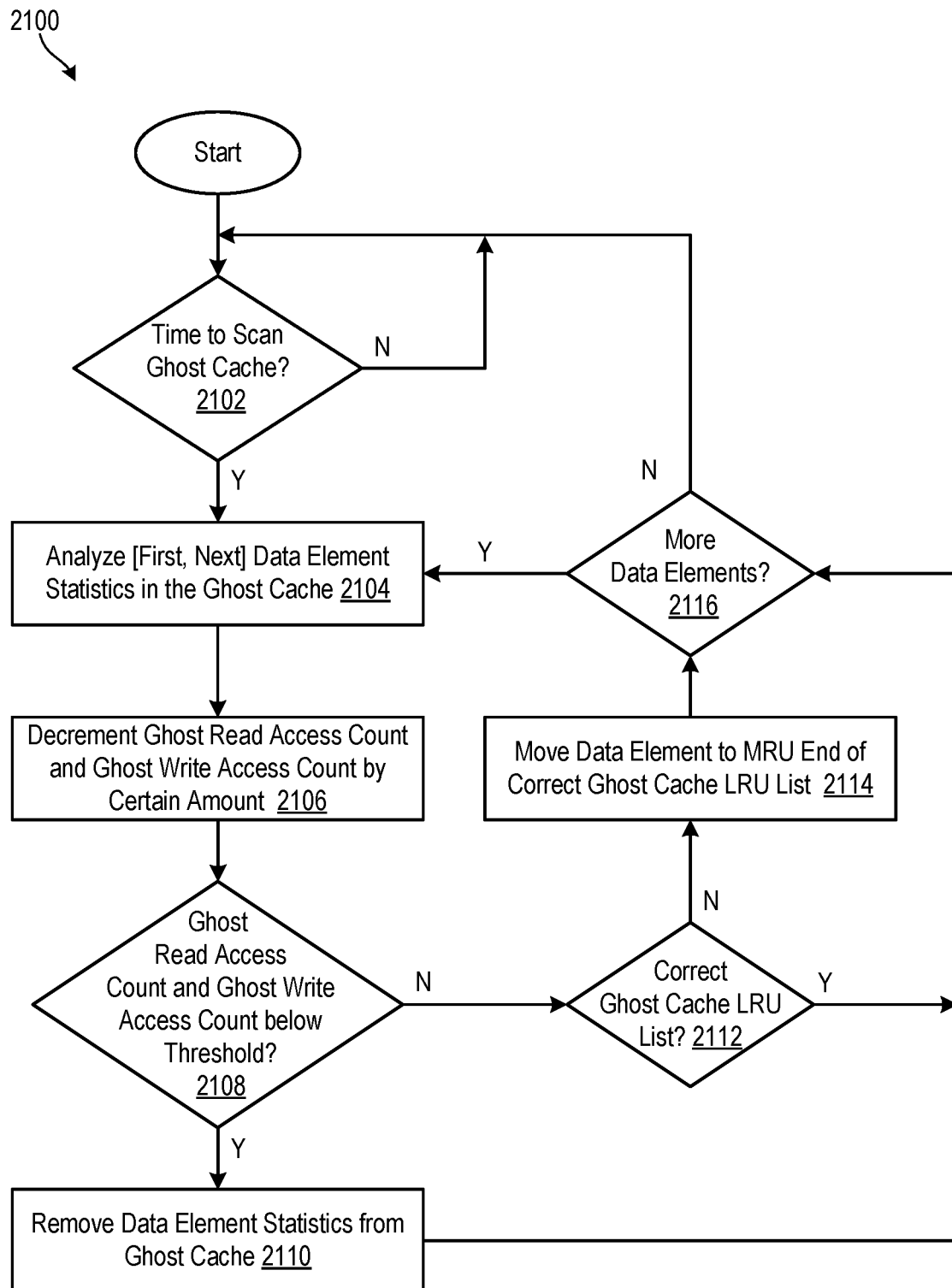
FIG. 21 is a flow diagram showing one embodiment of a method for scanning and clearing space in the ghost cache.

Referring to FIG. 21, in order to clear space in the ghost cache 1400 to make room for statistics 1408 for new data elements, the ghost cache 1400 may be periodically scanned (e.g., every hour, every day, etc.) and cleared of statistics 1408 for data elements that are no longer frequently accessed. As shown, the method 2100 determines 2102 whether it is time to scan the ghost cache 1400. If so, the method 2100 analyzes 2104 statistics 1408 associated with a first data element in the ghost cache 1400. The method 2100 also decrements 2106 the ghost read access count 1410 and ghost write access count 1412 for the data element by a certain amount (e.g., one to three). The amount that the ghost read access count 1410 and ghost write access count 1412 are decremented may be based on a frequency of the scan and/or an average ghost read access count 1410 and ghost write access count 1412 in the ghost cache 1400.

The method 2100 then determines 2108 whether the ghost read access count 1410 and ghost write access count 1412 are below a threshold (e.g., zero or an average ghost read access count 1410 and/or ghost write access count 1412 in the ghost cache 1400). If so, the method 2100 removes 2110 the statistics 1408 associated with the data element from the ghost cache 1400. If the ghost read access count 1410 and ghost write access count 1412 are not below the threshold, the method 2100 determines 2112 whether the data element is in a correct ghost cache LRU list 1406. If statistics 1408 for the data element have changed such that the data element belongs in a different ghost cache LRU list 1406, the method 2100 moves 2114 the data element to the MRU end of the correct ghost cache LRU list 1406. If the data element is in the correct ghost cache LRU list 1406, the method 2100 leaves the data element in its current ghost cache LRU list 1406.

At this point, the method 2100 determines 2116 whether there are more data elements and associated statistics 1408 to analyze in the ghost cache 1400. If so, the method 2100 analyzes 2104 statistics 1408 associated with the next data element in the manner previously described. If there are no more statistics 1408 to analyze, the method 2100 ends.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Several examples will now be provided to further clarify various aspects of the present disclosure:

Example 1: A method maintains a heterogeneous cache comprising a higher performance portion and a lower performance portion. The method maintains, within the lower performance portion, a ghost cache containing statistics for data elements that are currently contained in the heterogeneous cache, and data elements that have been demoted from the heterogeneous cache within a specified time interval. The method maintains updates to the statistics in an update area within the higher performance portion. The method determines whether the updates have reached a specified threshold and, in the event the updates have reached the specified threshold, flushes the updates from the update area to the ghost cache to update the statistics.

Example 2: The limitations of Example 1, wherein the statistics include a read count for each of the data elements.

Example 3: The limitations of Example 2, wherein the statistics include a write count for each of the data elements.

Example 4: The limitations of Example 3, further comprising periodically decrementing the read count and write count of each data element.

Example 5: The limitations of any of Examples 3 and 4, further comprising removing, from the ghost cache, statistics for data elements whose read count and write count are zero.

Example 6: The limitations of any of Examples 3 and 4, further comprising removing, from the ghost cache, statistics for data elements whose read count and write count are below a threshold.

Example 7: The limitations of any of Examples 1-6, wherein determining whether the updates have reached the specified threshold comprises determining whether the update area is full.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

Example 10: A method maintains a heterogeneous cache comprising a higher performance portion and a lower performance portion. The method maintains, within the lower performance portion, a ghost cache containing statistics for data elements that are currently contained in the heterogeneous cache, and data elements that have been demoted from the heterogeneous cache within a specified time interval. The method maintains, as part of the statistics, a read and write count for each of the data elements. The method maintains updates to the statistics in an update area within the higher performance portion. The method determines whether the updates have reached a specified threshold and, in the event the updates have reached the specified threshold, flushes the updates from the update area to the ghost cache to update the statistics.

Example 11: The limitations of Example 10, further comprising periodically decrementing the read count and write count of each data element.

Example 12: The limitations of Examples 10 and 11, further comprising removing, from the ghost cache, statistics for data elements whose read count and write count are below a threshold.

Example 13: The limitations of Examples 10-12, wherein determining whether the updates have reached the specified threshold comprises determining whether the update area is full.

Example 14: A system comprising one or more processor and one or more computer-readable storage media collectively storing program instructions which, when executed by the processor, are configured to cause the processor to perform a method according to any of Examples 10-13.

The invention claimed is:

1. A method for maintaining statistics for data elements in a cache, the method comprising:
maintaining a heterogeneous cache comprising a higher performance portion and a lower performance portion;
maintaining, within the lower performance portion, a ghost cache containing access counts for the following: data elements that are currently contained in the heterogeneous cache, and data elements that have been demoted from the heterogeneous cache within a specified time interval, wherein the specified time interval is a specified amount of time after a data element has been demoted from the heterogeneous cache during which at least one access count for the data element is maintained and updated in the ghost cache;
maintaining updates to the access counts in an update area within the higher performance portion;
determining whether the updates have reached a specified threshold; and
in the event the updates have reached the specified threshold, flushing the updates from the update area to the ghost cache to update the access counts.

2. The method of claim 1, wherein the access counts include a read count for each of the data elements.

3. The method of claim 2, wherein the access counts include a write count for each of the data elements.

4. The method of claim 3, further comprising periodically decrementing the read count and write count of each data element.

5. The method of claim 4, further comprising removing, from the ghost cache, access counts for data elements whose read count and write count are zero.

6. The method of claim 4, further comprising removing, from the ghost cache, access counts for data elements whose read count and write count are below a threshold.

7. The method of claim 1, wherein determining whether the updates have reached the specified threshold comprises determining whether the update area is full.

8. A computer program product for maintaining statistics for data elements in a cache, the computer program product comprising a non-transitory computer-readable storage medium having computer-usable program code embodied therein, the computer-usable program code configured to perform the following when executed by at least one processor:
maintain a heterogeneous cache comprising a higher performance portion and a lower performance portion;
maintain, within the lower performance portion, a ghost cache containing access counts for the following: data elements that are currently contained in the heterogeneous cache, and data elements that have been demoted from the heterogeneous cache within a specified time interval, wherein the specified time interval is a specified amount of time after a data element has been demoted from the heterogeneous cache during which at least one access count for the data element is maintained and updated in the ghost cache;
maintain updates to the access counts in an update area within the higher performance portion;
determine whether the updates have reached a specified threshold; and
in the event the updates have reached the specified threshold, flush the updates from the update area to the ghost cache to update the access counts.

9. The computer program product of claim 8, wherein the access counts include a read count for each of the data elements.

10. The computer program product of claim 9, wherein the access counts include a write count for each of the data elements.

11. The computer program product of claim 10, wherein the computer-usable program code is further configured to periodically decrement the read count and write count of each data element.

12. The computer program product of claim 11, wherein the computer-usable program code is further configured to remove, from the ghost cache, access counts for data elements whose read count and write count are zero.

13. The computer program product of claim 11, wherein the computer-usable program code is further configured to remove, from the ghost cache, access counts for data elements whose read count and write count are below a threshold.

14. The computer program product of claim 8, wherein determining whether the updates have reached the specified threshold comprises determining whether the update area is full.

15. A system for maintaining statistics for data elements in a cache, the system comprising:
at least one processor; and
at least one memory device operably coupled to the at least one processor and storing instructions for execution on the at least one processor, the instructions causing the at least one processor to:
maintain a heterogeneous cache comprising a higher performance portion and a lower performance portion;
maintain, within the lower performance portion, a ghost cache containing access counts for the following: data elements that are currently contained in the heterogeneous cache, and data elements that have been demoted from the heterogeneous cache within a specified time interval, wherein the specified time interval is a specified amount of time after a data element has been demoted from the heterogeneous cache during which at least one access count for the data element is maintained and updated in the ghost cache;
maintain updates to the access counts in an update area within the higher performance portion;
determine whether the updates have reached a specified threshold; and
in the event the updates have reached the specified threshold, flush the updates from the update area to the ghost cache to update the access counts.

16. The system of claim 15, wherein the access counts include a read count for each of the data elements.

17. The system of claim 16, wherein the access counts include a write count for each of the data elements.

18. The system of claim 17, wherein the instructions further cause the at least one processor to periodically decrement the read count and write count of each data element.

19. The system of claim 18, wherein the instructions further cause the at least one processor to remove, from the ghost cache, access counts for data elements whose read count and write count are zero.

20. The system of claim 18, wherein the instructions further cause the at least one processor to remove, from the ghost cache, access counts for data elements whose read count and write count are below a threshold.

21. A method for maintaining statistics for data elements in a cache, the method comprising:
maintaining a heterogeneous cache comprising a higher performance portion and a lower performance portion;
maintaining, within the lower performance portion, a ghost cache containing access counts for the following: data elements that are currently contained in the heterogeneous cache, and data elements that have been demoted from the heterogeneous cache within a specified time interval, wherein the specified time interval is a specified amount of time after a data element has been demoted from the heterogeneous cache during which at least one access count for the data element is maintained and updated in the ghost cache;
maintaining, as part of the access counts, a read and write count for each of the data elements;
maintaining updates to the access counts in an update area within the higher performance portion;
determining whether the updates have reached a specified threshold; and
in the event the updates have reached the specified threshold, flushing the updates from the update area to the ghost cache to update the access counts.

22. The method of claim 21, further comprising periodically decrementing the read count and write count of each data element.

23. The method of claim 22, further comprising removing, from the ghost cache, access counts for data elements whose read count and write count are below a threshold.

24. The method of claim 21, wherein determining whether the updates have reached the specified threshold comprises determining whether the update area is full.

25. A system for maintaining statistics for data elements in a cache, the system comprising:
at least one processor; and
at least one memory device operably coupled to the at least one processor and storing instructions for execution on the at least one processor, the instructions causing the at least one processor to:
maintain a heterogeneous cache comprising a higher performance portion and a lower performance portion;
maintain, within the lower performance portion, a ghost cache containing access counts for the following: data elements that are currently contained in the heterogeneous cache, and data elements that have been demoted from the heterogeneous cache within a specified time interval, wherein the specified time interval is a specified amount of time after a data element has been demoted from the heterogeneous cache during which at least one access count for the data element is maintained and updated in the ghost cache;

maintain, as part of the access counts, a read and write count for each of the data elements;
maintain updates to the access counts in an update area within the higher performance portion;
determine whether the updates have reached a specified threshold; and
in the event the updates have reached the specified threshold, flush the updates from the update area to the ghost cache to update the access counts.

\* \* \* \* \*